US008596581B2

(12) United States Patent
Criswell et al.

(10) Patent No.: US 8,596,581 B2
(45) Date of Patent: *Dec. 3, 2013

(54) POWER GENERATING AND DISTRIBUTION SYSTEM AND METHOD

(75) Inventors: David R. Criswell, Houston, TX (US); Jori L. Petersen, Redondo Beach, CA (US)

(73) Assignee: David R. Criswell, Houston, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/323,585

(22) Filed: Dec. 12, 2011

(65) Prior Publication Data

US 2012/0153744 A1    Jun. 21, 2012

Related U.S. Application Data

(63) Continuation-in-part of application No. 13/013,791, filed on Jan. 25, 2011, now Pat. No. 8,074,936, which is a continuation of application No. 11/184,158, filed on Jul. 18, 2005, now Pat. No. 7,900,875.

(60) Provisional application No. 60/589,919, filed on Jul. 20, 2004, provisional application No. 60/602,772, filed on Aug. 19, 2004, provisional application No. 61/530,294, filed on Sep. 1, 2011.

(51) Int. Cl.
*B64G 1/44* (2006.01)

(52) U.S. Cl.
USPC ...................................... 244/172.7; 455/13.1

(58) Field of Classification Search
USPC ............ 244/172.7, 172.8; 136/244, 292, 246; 60/281, 39.52
See application file for complete search history.

(56) References Cited

U.S. PATENT DOCUMENTS

| 3,933,323 A | 1/1976 | Dudley et al. |
| 3,989,994 A | 11/1976 | Brown |
| 4,187,506 A | 2/1980 | Frosch et al. |
| 4,371,135 A | 2/1983 | Keigler |
| 4,834,324 A | 5/1989 | Criswell |
| 4,836,470 A | 6/1989 | Criswell |
| 5,019,768 A | 5/1991 | Criswell et al. |
| 5,217,187 A | 6/1993 | Criswell |

(Continued)

FOREIGN PATENT DOCUMENTS

| JP | 2003-134700 | 9/2003 |
| RU | 2 094 949 C1 | 10/1997 |
| RU | 2001124515 | 9/2001 |
| RU | 2002129841 | 11/2002 |

OTHER PUBLICATIONS

Wireless Energy Transfer; paper; Jun. 1, 2008; 12 pgs; Wikipedia.

(Continued)

*Primary Examiner* — Philip J Bonzell
(74) *Attorney, Agent, or Firm* — Gordon & Rees LLP

(57) ABSTRACT

A power distribution network is provided comprising ground-based microwave transmitters, receivers and microwave redirectors. The ground-based microwave transmitters have their own directional, focus and amplitude controllers for aiming a focused microwave beam at a microwave redirector. The microwave redirectors each have a receiving antenna and a plurality of transmitting antennae such that the redirectors transmit focused microwave beams to at least two different stations (for example, being either ground-based microwave receivers or other microwave redirectors).

34 Claims, 16 Drawing Sheets

(56) References Cited

U.S. PATENT DOCUMENTS

| | | | |
|---|---|---|---|
| 5,223,781 A | 6/1993 | Criswell et al. | |
| 5,224,663 A | 7/1993 | Criswell | |
| 5,570,102 A | 10/1996 | Kochiyama et al. | |
| 5,685,505 A | 11/1997 | Meckler | |
| 6,492,940 B2 | 12/2002 | Mikami et al. | |
| 6,664,101 B2 | 12/2003 | Wild | |
| 6,727,425 B2 | 4/2004 | Takada et al. | |
| 7,216,833 B2 | 5/2007 | D'Ausilio et al. | |
| 7,456,803 B1 | 11/2008 | Sievenpiper | |
| 8,074,936 B2 | 12/2011 | Criswell | |
| 2002/0029797 A1* | 3/2002 | Mikami et al. | 136/244 |
| 2004/0156400 A1 | 8/2004 | Caplan et al. | |

OTHER PUBLICATIONS

Hurst; Is Wireless Power Closer Than We Think?; paper; May 2, 2008; 4 pgs; CleanTechnica.com.

Hanley; Drilling Up Into Space; paper; Dec. 26, 2007; 13 pgs; Associated Press.

Wilson; How Wireless Power Works; paper; Jun. 6, 2008; 4 pgs; howstuffworks.

Dinkin; Rectifying the case for beaming lunar solar power; Article; Apr. 11, 2005; 11 pgs; The Space Review.

Muller et al,; Power Beaming Using FELs; paper; 2003; 9 pgs; Particle Beam Physics Lab.

How to harvest solar power? Beam it down from space!; paper; Jun. 6, 2008; 3 pgs; Peak Oil.

Farrar; How to harvest solar power? Beam it down from space!; paper; Jun. 6, 2008; 4 pgs; CNN.

Table Top Solar Power Beaming Project; paper; Jun. 6, 2008; 5 pgs; The Moon Society.

Project Status; Table Top Solar Power Beaming Demonstrator Project; paper; May 11, 2008; 15 pgs; The Moon Society.

Microwave Power Transmission; paper; Mar. 20, 2008; 3 pgs; Wikipedia.

Budimir; Research Activities and Future Trends of Microwave Wireless Power Transmission; paper; Oct. 18, 2006; 5 pgs; Sixth International Symposium Nikola Tesla.

In-Depth Analysis of Microwave Power Transmission & Solar Power Satellite Systems; paper; 2008; 3 pgs; Business Wire.

Terrestrial Microwave Power Transmission System Units; paper; Jun. 6, 2008; 2 pgs; Satellite Communication Systems.

Glaser, P.E., "The Power Relay Satellite," Space Power USA, vol. 13, No. 1-2, pp. 1-23 (1994).

Hashimoto, K., et al., "Direction Finding System for Spread Spectral Pilot Signals From Multiple Microwave Power Receiving Sites," Proceedings of the 2000 Symposium on Antennas and Propagation, IEICE of Tokyo, Japan, vol. 3, 2000, pp. 1199-1202 (2000).

Komiyama, K., et al., "Microwave Earth-to-Earth Power Relay Satellite Assessment," Space Energy & Transportation High Frontier, vol. 1., No. 4, pp. 424-434 (1996).

Mankins, J.C., "A Fresh Look at Space Solar Power," Energy Conversion Engineering Conference, Proceedings of the 31st Intersociety, vol. 1, pp. 451-456 (1996).

PCT International Search Report and Written Opinion, PCT/US2005/025525 (Mar. 16, 2007) (24 Pages).

Ehricke, K.A., "Use of Shuttle in Establishing Large Space Installations," in Space Shuttle Payloads, vol. 30, Science and Technology, Proceedings of Symposium at Annual Meeting of American Association for the Advancement of Science, Dec. 27-28, 1972, pp. 397-426.

Ehricke, K.A., "Regional Power Distribution via Power Relay Satellite," in Los Angeles Council of Engineers and Scientists Proceedings Series, 1975, vol. 1, pp. 204-209.

Criswell, D.R., "Solar Power via the Moon," in The Industrial Physicist, Apr./May 2002, pp. 12-15.

Hyypia, J., "Iceland's Heat Energy: Solution to a Future Crunch?" in Science and Mechanics, Summer 1979, pp. 49-51 and 106-107.

Rogers, T.F., "Reflector Satellites for Solar Power," IEEE Spectrum, Jul. 1981, pp. 38-43.

Nasa Tech Briefs, "Inflatable Reflectarray Antennas : Reflector surfaces are stretched flat by inflating circular toroidal tubes.—NASA's Jet Propulsion Laboratory, Pasadena, California" NPO20433 :: Nasa Tech Briefs p. 1 of 1.

Mankins, J.C., "A Fresh Look at Space Solar Power," (pp.) 96571; 0-7803-3547-3-7/18 c1996 IEEE.

User's Manual : TX91501—915 Mhz Powercaster Transmitter Rev A—Oct. 2010 pp. 1-7; Powercast Lifetime Power Energy Harvesting Development Kit for Battery Charging P2110-EVAL-02 pp. 1-10.

www.wirelesspowerconsortium.com—"How Wireless Electricity Transmission Works" pp. 1-2; www.wirelesspowerconsortium.com—"Inductive Power Transmission" pp. 1-2.

Development Kits | Wireless Power Solutions | Powercast Corp. Sep. 28, 2011 pp. 1-6.

www.lifehack.org—"Wireless Extension Cords" Aug. 31, 2011 pp. 1-7; www.thinkgeek.com—"Wireless Extension Cords" Aug. 31, 2011 pp. 1-2.

www.wired.com—"Charge! Darpa Wants Wireless Power-Up for Troops' Gadgets" Sep. 28, 2011 pp. 1-3.

* cited by examiner

FIG. 6
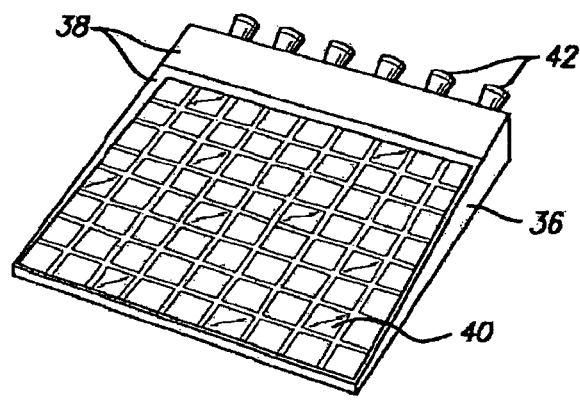
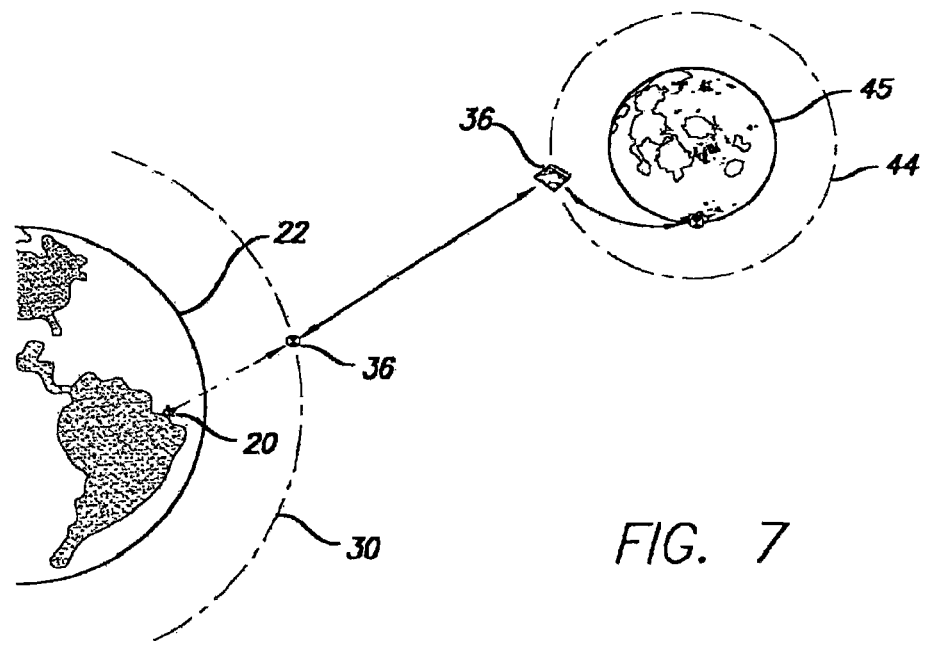
FIG. 7

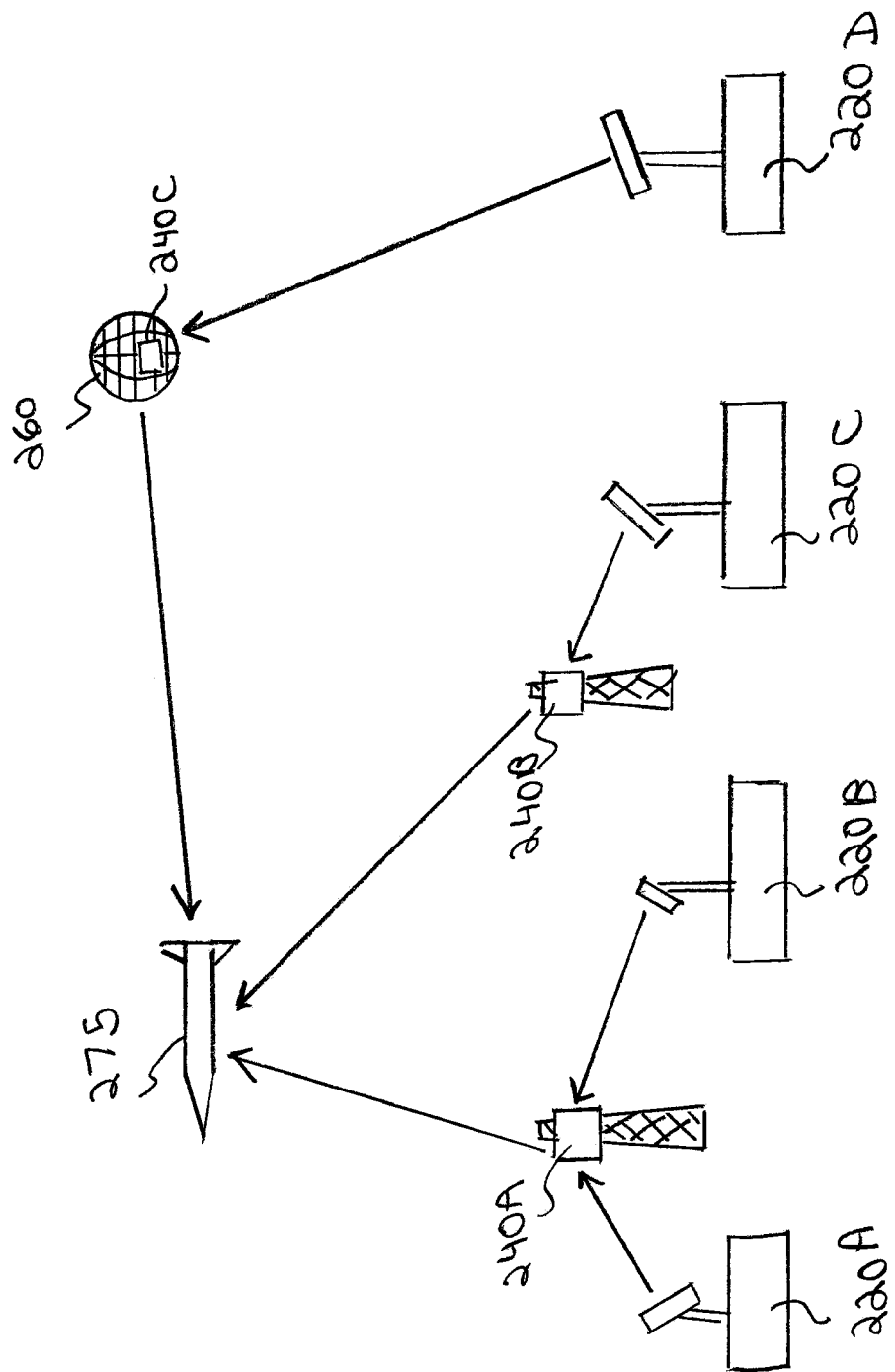

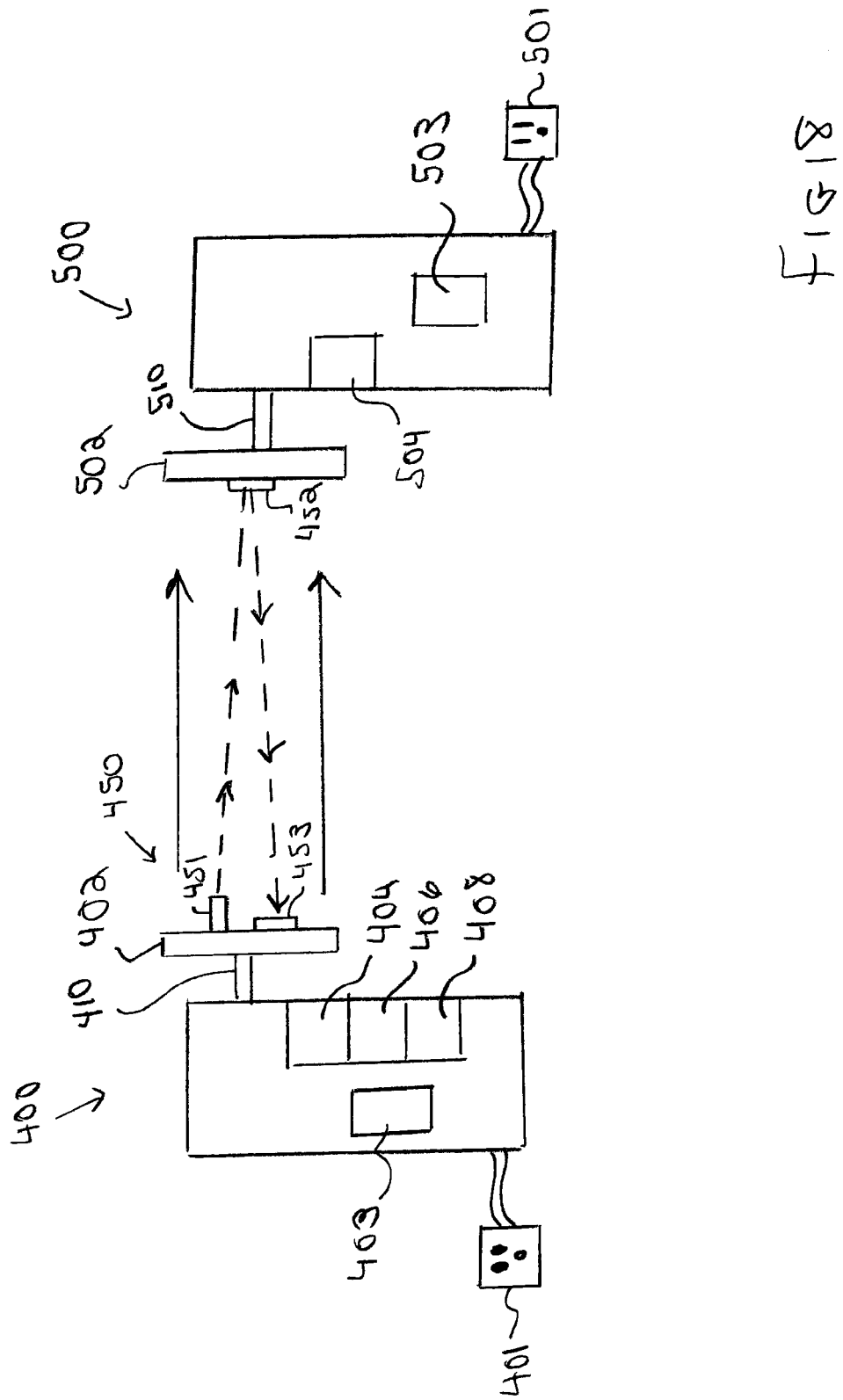

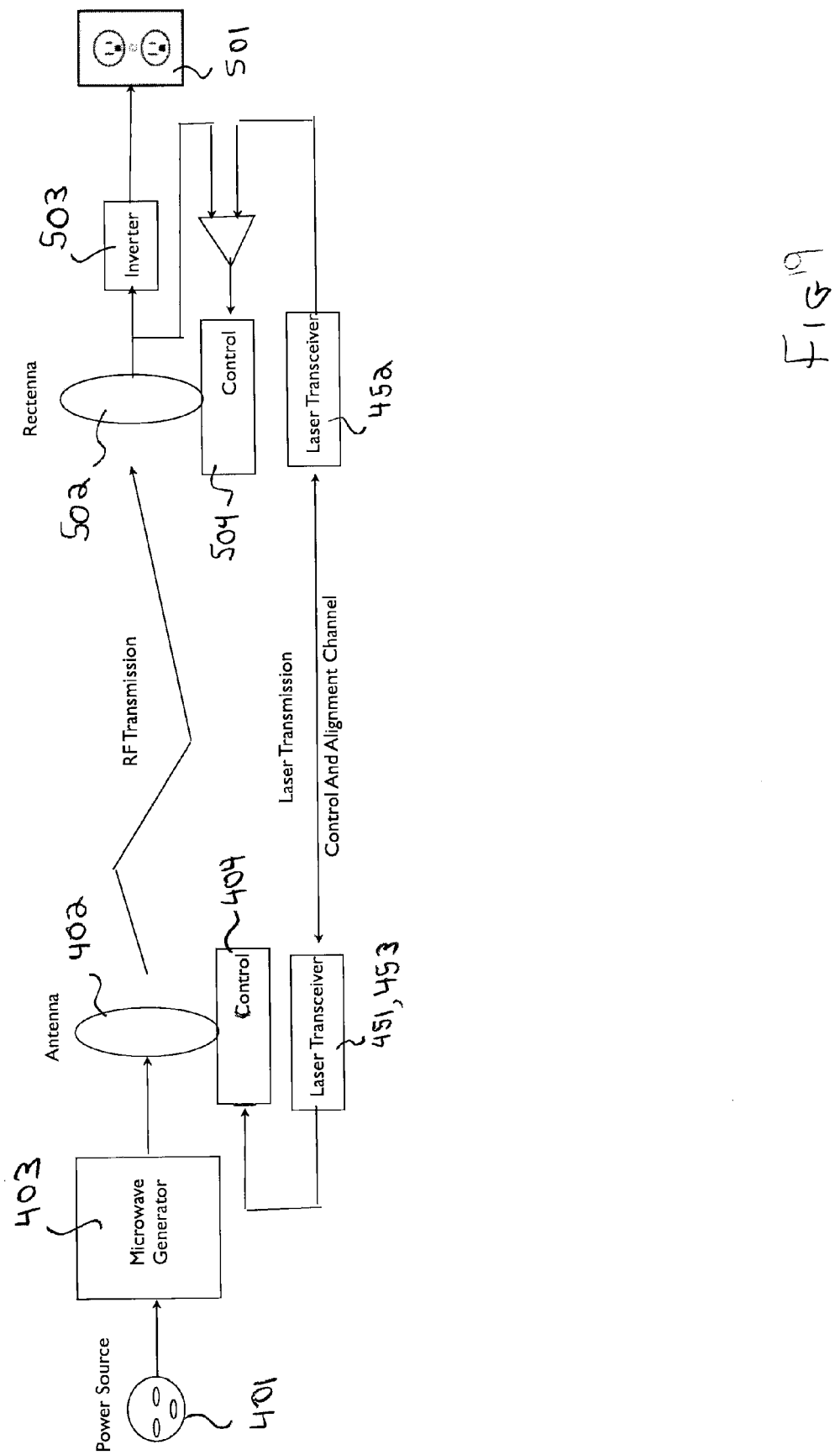

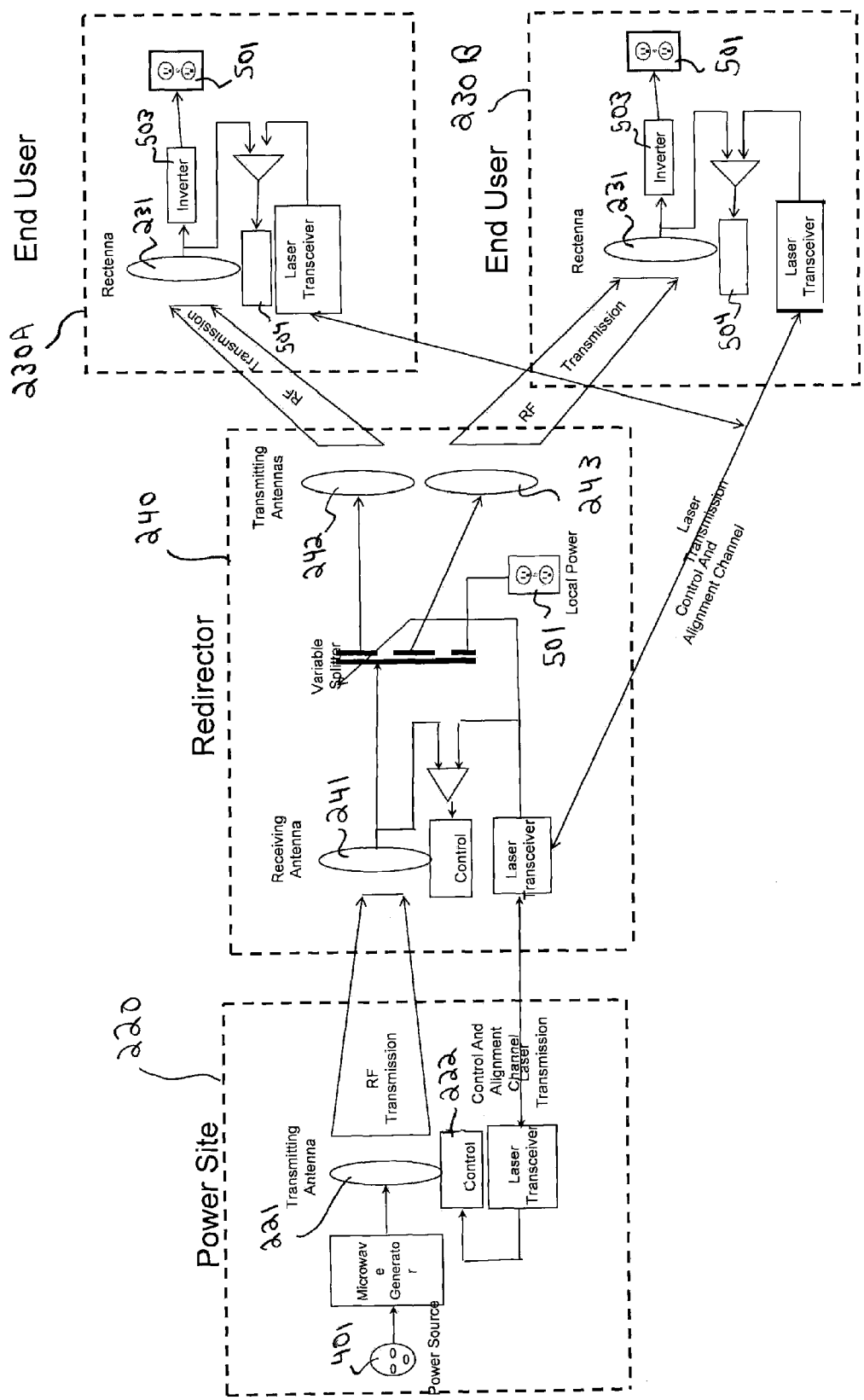

US 8,596,581 B2

POWER GENERATING AND DISTRIBUTION SYSTEM AND METHOD

CROSS-REFERENCES TO RELATED APPLICATIONS

This application is a Continuation In Part of U.S. application Ser. No. 13/013,791 now U.S. Pat. No. 8,074,936 filed Jan. 25, 2011 now U.S. Pat. No. 8,074,936 which is a Continuation of U.S. application Ser. No. 11/184,158, now U.S. Pat. No. 7,900,875, filed Jul. 18, 2005 which claims the benefit of priority of U.S. provisional Applications Ser. No. 60/589,919 filed Jul. 20, 2004, and Ser. No. 60/602,772 filed Aug. 19, 2004, the contents of both of which are incorporated herein by reference in their entirety. This application also claims priority to U.S. Provisional patent application 61/530,294, filed Sep. 1, 2011.

BACKGROUND OF THE INVENTION

The present invention is directed to a method and system for generating power and distributing the power to populated areas where it is needed, and to the use of the method to enable the deployment of a lunar solar power system by means of electric energy from Earth in support of a transportation system between the Earth, space, and the Moon, and also to provide support for operations on the Moon.

It is estimated that, by the year 2050, a prosperous world of 10 billion people will require at least 20 TWe of electric power. Currently, electricity is generated using fuel such as oil, natural gas, nuclear energy, and coal, with a small amount being generated by renewable energy sources such as solar, wind, or hydroelectric facilities. Independent oil companies face increasing hurdles to maintaining access to significant natural reserves of oil and natural gas, due to the geopolitical distribution of such resources. Additionally, the recovered fuel must be transported safely to an electric power-generating facility which is typically remote from the recovery site, and often in a different country. This involves pipelines, ships, tankers and the like. Such transportation is expensive both to install and maintain, and is potentially dangerous as a result of accidents, sabotage or terrorism. Finally, progressive exhaustion of readily accessible fossil fuel resources requires exploration to attempt to find new sources of such fuels. The struggle to locate and develop new sources of gas and oil will increase in difficulty over time, as such resources continue to be depleted by world power demands and population increases. This has resulted in progressively higher prices and shortages in the power supply to the world population, and this problem is expected to become worse with time.

The present invention is related to my prior U.S. Pat. Nos. 8,074,936 and 7,900,875 directed to a Power Generating And Distribution System and Method and to U.S. Pat. Nos. 5,019,768 and 5,223,781 directed to a Power Collection and Transmission System and Method, and the contents of these patents are incorporated herein by reference. In these patents, the power collection system comprises solar power collecting stations which convert solar power into low intensity beams of microwaves. The microwave beams are directed to a microwave receiver or rectenna that converts the beam into electricity. A rectenna is a field of closely spaced antennas that rectifies microwaves into electricity. U.S. Pat. No. 5,019,768 describes a lunar based solar power system using microwaves to deliver commercial power to the Earth. Such a system is far less environmentally intrusive, much safer, and more dependable than a terrestrial solar power system. Additionally, a solar power collection system on the Moon has the major physical advantage of being able to use orbital mirrors to concentrate sunlight on the solar-to-electric converters, due to the airless and cloudless lunar surface. It is much easier to make very thin mirrors than to make solar-to-electric converters. The latter devices require high purity silicon and other rare materials such as selenium, gallium, tellurium, cadmium, and germanium. The reflectors can concentrate the sunlight so that less area of solar cell is needed per unit of power output.

One potential problem with initial construction of a lunar based solar power collection and transmission system is the cost of deploying the necessary equipment to the Moon and establishing the solar power stations on the Moon.

SUMMARY OF THE INVENTION

It is an object of the present invention to provide a new and improved energy transportation system for redistributing energy from one Earth-based location to another. It is a further object of the present invention that power can be re-distributed around the Earth to various locations in a network of transmitter, redirector and receiver stations. In accordance with the present invention, some of the stations may be ground based, some may be airborne and based on or in balloons and aircraft. Some may be water-based on ships, etc. Optionally, some of the stations may also be spaced-based facilities including but not limited to satellites. Together, these stations function as nodes in a network through which power may be sent back and forth in different paths (and in different amounts) among the various nodes as needed to ensure that power is delivered exactly where it is desired. In addition, power transmissions among the various nodes in the network may be allocated by the redirectors such that different amounts of power are sent to different nodes and such that the power received by each redirector may be used to power the redirector.

It is a further object of the invention to provide a less expensive means of transporting equipment from the Earth into space, and particularly to the Moon, in order to allow a lunar-based solar power station to be completed in time to provide significant power to the Earth to reduce and eventually eliminate the dependence on fossil fuel supplies.

According to one aspect of the present invention, a power distribution system is provided, which comprises at least one source of electricity, at least one microwave transmitter for converting the electricity into at least one microwave beam and directing the beam in a selected direction and at least one orbiting redirector satellite for receiving the directed microwave beam. The redirector satellite has a transmitter for converting the received microwave beam into a plurality of outgoing microwave beams and directing the outgoing beams towards selected targets.

The electricity source, which may be an electricity-generating unit, and microwave transmitter in an exemplary embodiment are located on the Earth, but may be located on any celestial body, or in space. The targets may be receiver units on the Earth, on the Moon, additional redirector satellites in orbit about the Earth or the Moon, orbital, Earth-to-orbit or space transportation vehicles, or the like.

According to another aspect of the present invention, a method of transporting energy is provided, in which fuel from a natural source of energy such as oil, natural gas, methane, solid fuel, or a power source such as geothermal, nuclear, or renewable energy, is extracted from the source and converted into electricity at a first location on Earth, and the electricity is then converted into one or more microwave power beams at the same location. Each beam is directed to a redirector satellite in orbit about the Earth, which need not be in geosynchronous orbit. The redirector satellite then aims multiple microwave power beams to selected targets. The targets may be rectennas located in various consumer locations around the Earth, one or more relay satellites to direct beams to receivers on the far side of the Earth through two or more relay steps, orbital vehicles, Earth-to-orbit vehicles or space transportation vehicles, lunar base stations, and/or orbital redirector satellites in orbit about the Moon.

This system will significantly reduce the cost of producing and distributing electricity from various naturally occurring fuel sources. In the current system, fuels such as oil and gas are typically transported by pipes, ships, trucks, rail or the like from their source to one or more power distribution locations in major consumer nations. Additionally, electricity produced by solid fuel, geothermal, or nuclear power plants, or renewable systems, is often transported over large distances through power lines. The current Earth-based energy transportation system requires major physical assets such as pipelines, ships, rail lines, tanker trucks, power lines, and the like, which are expensive to construct initially, as well as to maintain and protect. The system of this invention avoids the Earth-based infrastructure for transporting energy or fuel over large distances on Earth, and instead converts the fuel or energy source into electricity at its source, then converts the electricity into microwave beams which are directed from Earth onto one or more redirector satellites orbiting the Earth. Rather than transporting atoms, this system transports photons, which is much faster and more efficient.

The microwave energy is received then selectively redirected onto receiver stations on Earth which are located near the consumer. The beamed power can be redirected, on a second-by-second basis, to the markets needing the power, avoiding the need for long distance Earth transportation of large volumes and weights of fuel. Further, the microwave energy of this system has essentially no latency and can almost instantaneously be redirected as compared with the latency of oil in a pipeline, for example.

The beam redirector is deployed from Earth and assembled in low orbit about the Earth. In an exemplary embodiment of the invention, the assembled beam redirector may be transported from low Earth orbit into high orbit or geosynchronous orbit by a low-cost ion-drive type transport vessel, such as proposed by W. Brown (Brown, W. C. A Transporttronic Solution to the Problem of Interorbital Transportation, NASA CR-191162/pt-7452, FIGS. 1-11, July 1992). This transport vessel can be powered by microwave beams transmitted from the transmitters on Earth.

According to another aspect of the present invention, a unified power-generating and distributing system is provided, which comprises at least one combined power extracting, converting, and transmitting facility adjacent a source of fossil fuel, the facility having an extraction unit for extracting the fossil fuel, an electricity-generating unit located adjacent the extraction unit for converting the fuel into electricity, and a microwave beaming unit adjacent the electricity-generating unit for converting the electricity into at least one microwave beam, the beaming unit including a beam director to direct the microwave beam, at least one redirector satellite orbiting the Earth for receiving the microwave beam, and a plurality of rectenna receiver stations on Earth for receiving microwave beams and converting the beams into electricity, the satellite having a beam directing apparatus for directing plural microwave beams to selected rectenna stations depending on current power requirements. The microwave beam may be relayed through at least two redirector satellites before being directed onto selected rectenna receiver stations.

In an exemplary embodiment of the invention, the power facility also has a collector for collecting waste gases such as carbon dioxide and pressurized gases or steam produced by the electricity-generating unit, and an injection device for injecting the waste gases back into the buried fossil fuel supply, which may be an oil field, natural gas field, or coal supply. This will result in enhanced recovery of fossil fuel from a depleted field, as well as reducing or eliminating pollution of the atmosphere as a result of gases which would otherwise be released from the electricity-generating unit. Chemicals that release oil from porous rock can be manufactured using the power and chemicals released during power production.

It is well known that, for all oil fields, most of the oil still remains after primary recovery (natural pressurization and pumping) and secondary recovery (usually water flooding) techniques have reached their limits. Studies have indicated that more oil can potentially be recovered using carbon dioxide injection than is extracted using primary and secondary recovery techniques. By providing the electricity-generating facility at the same site as the oil field or other fossil fuel supply, a supply of pressurized carbon dioxide and other gases can be recovered on site at little expense and used immediately for injection into the oil field or the like for enhanced extraction. This also reduces or eliminates pollution from the gaseous byproducts of electricity generators such as steam turbines or the like.

Sequestration of carbon dioxide, or long term storage of carbon dioxide in underground tanks or natural reservoirs, has been proposed in order to reduce atmospheric pollution. Up to now, the fossil fuel industry has tended to consider sequestration of carbon dioxide as an undesirable expense which may restrict the electricity-generating business. It would be extremely expensive to capture carbon dioxide from the flue gas and then transport it back to the fossil fuel source for sequestration. The method and system of this invention provides for electricity generation at the same site as the fossil fuel source, so that it is much more economical to capture the flue gas and inject it back into the fossil fuel supply or other fuel reservoir, such as an oil field. This will also have the benefit of enhanced oil or other fuel recovery, which more than counteracts the cost of the carbon dioxide capture and sequestration.

The terrestrial power generation and microwave beaming system and method may be readily adapted to provide an inexpensive power for space transportation purposes in addition to electrical power supply to consumers on Earth. Additionally, power beams may be aimed directly from the Earth to lunar bases or redirector satellites orbiting the Moon. This may make construction of the lunar solar power station described in the above identified patents more feasible. Additional redirector satellites in orbit may be used to support space operations or to transmit power directly to rectenna stations on the Moon.

The microwave beam or several such beams can be directed from the Earth-based transmitter sites and/or orbiting satellites to power a cargo vessel to transport necessary equipment from the Earth to the Moon, for construction of a lunar based power collection and transmission system as described in my prior patents referenced above. An ion-drive cargo vessel with a rectenna on the side will receive a beam of microwaves from a succession of beaming sites on the Earth and in space in order to provide power to drive the vessel from low Earth orbit into orbit about the Moon. After the equipment has been transported from the vessel to the lunar surface by suitable landing vehicles the vessel may be returned to low Earth orbit. Although the journey will take longer than a conventional rocket system, this system will dramatically reduce the mass of propellant needed and the cost for deploying equipment to the Moon, since complex rockets and their large loads of fuel and equipment are eliminated.

According to yet another aspect of the invention, a power distribution network is provided comprising ground-based microwave transmitters, receivers and microwave redirectors. The ground-based microwave transmitters have their own directional, focus and amplitude controllers for aiming a focused microwave beam at a microwave redirector. The microwave redirectors each have a receiving antenna and a plurality of transmitting antennae such that the redirectors transmit focused microwave beams to at least two different stations (for example, being either ground-based microwave receivers or other microwave redirectors). It is to be understood that the term "antenna" may include any wire strung between electric insulators, and may include antennae with apertures, arrays, dishes, etc.

An important feature of this particular embodiment of the invention is that each of the redirectors can send power beams to two or more stations. A control system is also included enabling feedback as to the status of the various stations in the network. This permits load amounts to be adjusted and re-balanced among the various stations. Such adjustment may be done continuously or periodically. Both the amounts and the directions of power beamed between any two stations can also be changed from time to time. In one aspect of the invention, the control and feedback signals sent among the various stations are sent by modulating the power beams passing between the stations. Control and feedback signals can also be sent among the various stations by laser signals. The result is a true power distribution network in which power can be added at various stations and removed from other stations as desired. In optional aspects, either or both of the various ground-based transmitters and receivers can be coupled to the local power grid.

In various exemplary embodiments, the redirectors may be positioned on or in balloons, or be mounted to towers. Optionally, the redirectors can also be incorporated into flying objects, satellites in orbit or facilities in space. Optionally as well, the receivers and redirectors may be mounted onto ships, boats, and other platforms on water.

In yet another aspect of the invention, a "wireless extension cord" power distribution system is provided having a ground-based microwave transmitter and a ground-based microwave receiver. The ground-based microwave transmitter has its own directional, focus and amplitude controllers for aiming a focused microwave beam at the microwave receiver. The microwave receiver may optionally also have its own directional controller.

In various exemplary embodiments, a laser alignment system is also included to ensure that the transmitter and receiver correctly point towards one another. This laser alignment system may be a source and detector on the transmitter and a reflector on the receiver. An optional communication system between the transmitter and receiver can also be included.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 6 illustrates an ion-drive transport vessel which may be used for transport of materials and movement of orbital redirectors from low Earth orbit into high orbit;

FIG. 7 illustrates a system for using microwave beam energy from the Earth to transport equipment to the Moon for construction of a lunar power station;

FIG. 17 illustrates a hostile vehicle interception system in which redirectors on towers and on a balloon all direct their power beams at the same target.

FIG. 18 illustrates power being transmitted from a transmitter to a receiver showing a laser alignment system to ensure the transmitter and receiver point toward one another.

FIG. 19 illustrates various components of the system of FIG. 18.

FIG. 20 illustrates power being transmitted from a transmitter through a redirector and then on to two end users.

DETAILED DESCRIPTION OF THE INVENTION

Figure 1:
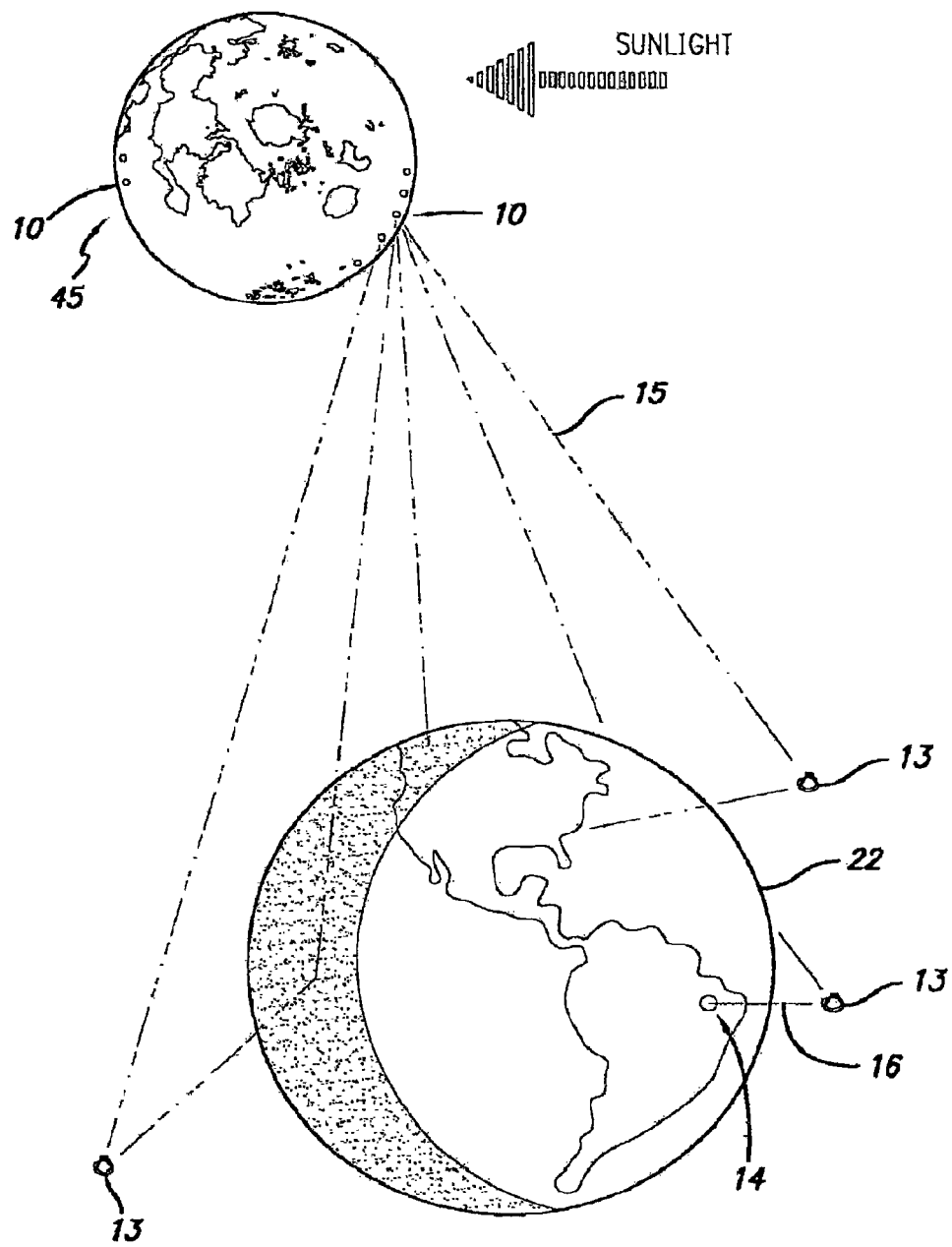
FIG. 1 is a schematic illustration of a prior art lunar power collection and transmission system.
Figure 2:
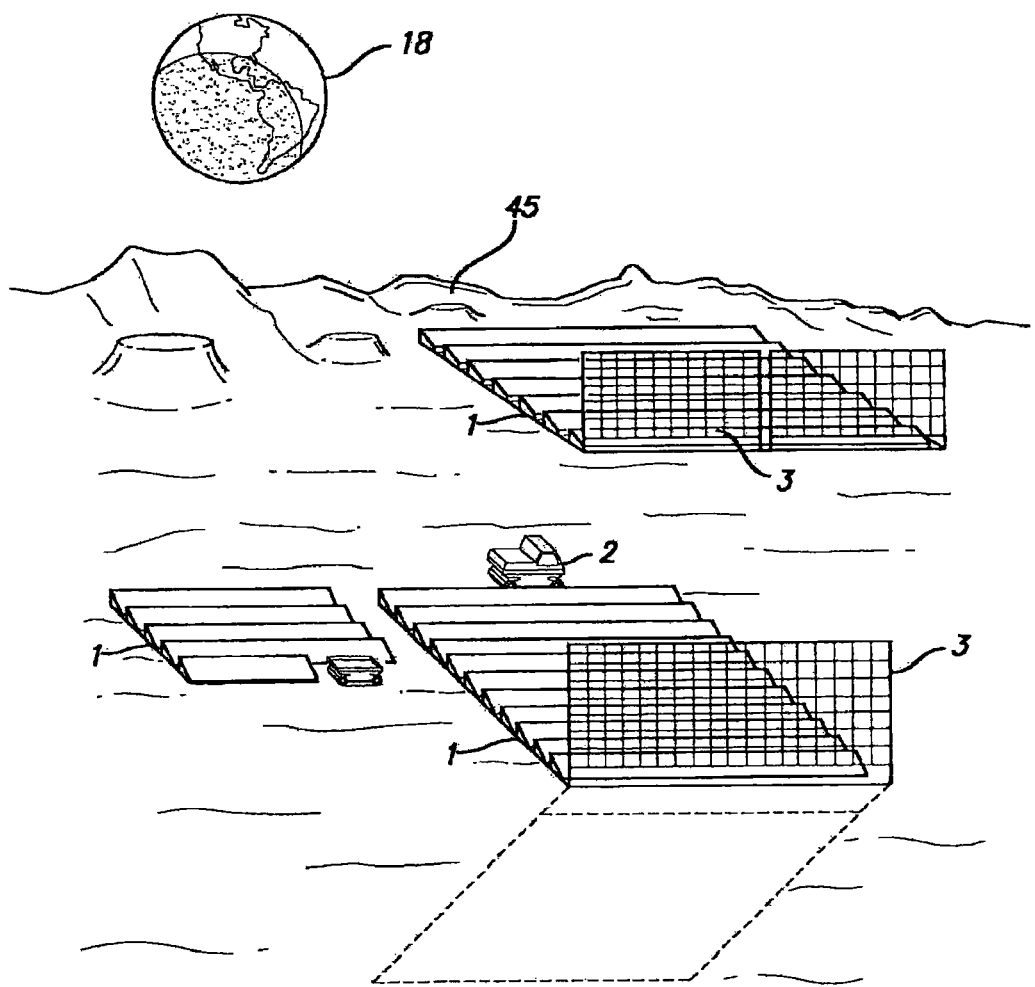
FIG. 2 is a schematic illustration of a power collection and transmission station on the Moon.

FIGS. 1 and 2 are schematic illustrations of a prior art power collection and transmission system as described in my U.S. Pat. Nos. 5,019,768 and 5,223,781, the contents of which are incorporated herein by reference. As illustrated in FIG. 1, solar power collecting and microwave transmitting stations 10 are provided on the Moon 45, and transmit microwave power beams 15 to orbiting redirectors 13 from which the beams 16 are transmitted onto selected small receiver or rectenna stations 14 on Earth 22. FIG. 2 illustrates an exemplary solar power collecting and microwave transmitting station on the Moon. The station comprises photovoltaic arrays or solar collectors 1, microwave transmitters 2, and a microwave reflective screen 3, as well as buried wiring.

With reference to FIG. 2, for the purpose of this application the term "far side" as applied to a first celestial body such as the Earth 18 or the Moon 45 means to the side which faces away from a second body or a specific location on the first body and is not in the line of sight of that body or location, the second body being another celestial body or an orbital satellite in orbit around the first body or second body.

Figure 3:
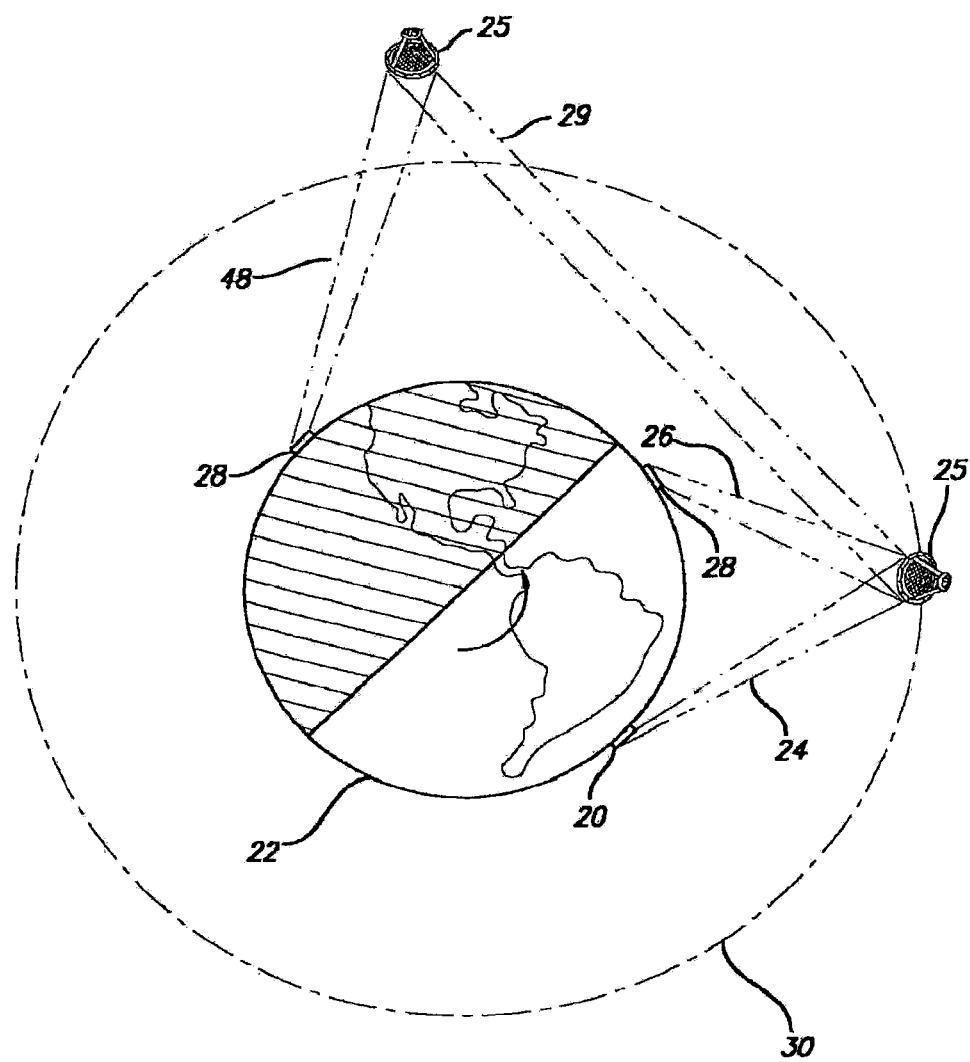
FIG. 3 illustrates an Earth-based energy transportation or distribution system according to an exemplary embodiment of the invention.

FIG. 3 illustrates an Earth-based energy transportation or distribution system and method according to an exemplary embodiment of the invention. Although the system and method as described below refers to power generation and transmission from Earth, it will be understood that this system may alternatively be based on other planets, moons or other celestial bodies. The system need not be attached to a surface of a celestial body and could be free floating in space in other embodiments.

In the exemplary embodiment of FIG. 3, one or more power-generating stations 20 are based on Earth 22 at the site of a natural fuel source, such as an oil or natural gas field, or coal mine, or other natural power source of power such as a geothermal reservoir, wind source, solar source, or the like. For the purpose of this application the term "power-generating station" means any suitable electricity-generating unit for converting any power source into electricity and any suitable device for converting the electricity into a microwave beam and directing the power beam to any selected target. The power generating station may include other devices in some embodiments, such as a waste gas recovery system. Each station 20 includes a converter or electricity-generating unit for converting the natural power source to electricity, a microwave antenna structure for converting the electricity into microwaves, and directing microwave beams 24 towards an orbiting redirector satellite 25 which is in low Earth orbit, high Earth orbit or geosynchronous orbit 30 about the Earth.

The stations 20 will be suitable for terrestrial operations. Each beam illuminates the redirector satellite, which receives the incoming microwave energy then sends one or more outgoing beams 26 to receivers or rectenna stations 28 located near consumers. The redirector satellite 25 can also send a power beam 29 to one or more additional redirector satellites 25 that can also redirect a beam 48 to a second receiver 28 that cannot directly view the first redirector satellite 25 (i.e. a receiver or rectenna station on the far side of the Earth from the first redirector satellite). The terrestrial transmitters 20 can be built using commercial vendors of microwave components, or in a similar manner to the lunar transmitters described in my prior U.S. patents referenced above. The arrangement is such that the receiver or rectenna stations are located in the near field of the microwave beam, as described in my prior U.S. Pat. No. 5,019,768 referenced above.

The microwave beams produced in this system are suitably around 12 centimeters in wavelength, which will pass through clouds, rain, fog, and dust, with little absorption. Nominally, the beams will have less than twenty percent of the intensity of sunlight at noon, and will dependably deliver power to the rectenna stations, which are several hundred meters or more in diameter. Each rectenna station converts at least 85% of the microwave power it receives into electricity and provides the electricity to local and regional power grids.

A rectenna station 28 comprises a field of closely spaced antennas that will rectify the microwaves into electricity and output the electrical power to the local power grid. Rectennas have been demonstrated to be capable of converting around 85% of an incident microwave beam into 1,100 $We/m^2$ of electric power. The rectenna may be constructed in a plot of land in a commercial or farming area to feed clean electric power to a region.

Figure 4:
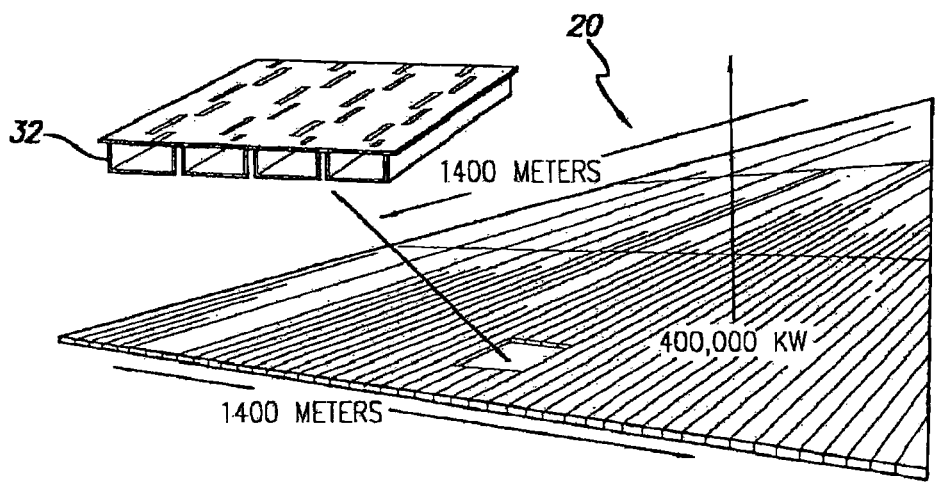
FIG. 4 illustrates a segment of a flat faced square array for microwave power beaming.

FIG. 4 illustrates part of a flat-faced, square array which may be used for microwave power beaming from station 20 of FIG. 3. This type of microwave power beaming array is described by Brown, W. C. (1994) A Transportronic Solution to the Problem of Interorbital Transportation, NASA Contract NAS3-25066, Raytheon Corp., 166 pp. The array comprises a series of slotted waveguides 32 forming a flat-faced array which can project a 400 MWe beam of microwaves to the receiver or the redirector satellite in orbit. This particular array geometry can sweep the beam 60 degrees to the east and west off the vertical. The slotted waveguides may be produced from thin-wall, sheet aluminum by a rolling and die-cutting process.

The redirector satellites 25 that orbit the Earth and receive power beams from stations 20 can retransmit the received power to multiple rectennas 28 on Earth in order to provide power anywhere on Earth. The redirector satellites eliminate the need for energy storage. These satellites do not have to be in geosynchronous or fixed orbit, which would limit where the power beam could be directed. Instead, the satellites 25 are in a wide range orbit and can provide power beams to any location on Earth. The redirector satellites 25 can also send power beams to one or more secondary satellites to redirect the beam to a receiver that cannot directly view the first satellite.

There are three general types of redirector which may be used in the satellites 25. The first is an orbital mirror, which directly reflects the beam back towards Earth. It would be necessary to constantly aim the mirror with high precision using ion-drives and reaction wheels. It is reported that reflectors of greater than 100 m. diameter have been flown (Criswell, D. R. (1998) Lunar Solar Power System for Energy Prosperity in the 21st Century, 17th World Energy Congress, Houston, Tex., http://www.worldenergy.org/wec-geis/publictions/default/tech-papers/17thcongress/4_1_33.asp)

The second option for a redirector is an orbital rectenna which can convert the beam to electricity and then power an associated microwave transmitter that rebroadcasts one or more beams toward the receiver on Earth. The "Synthetic Aperture Radar", flown on three flights of the space shuttle, has demonstrated the transmission of microwave power toward Earth. Criswell, D. R. (July 2002) Energy Prosperity within the 21st Century and Beyond: Options and the Unique Roles of the Sun and the Moon, Innovative Energy Strategies for $CO_2$ Stabilization, R. G. Watts, Editor, Cambridge University Press, Chapter 9, pp 345-410.

Figure 5:
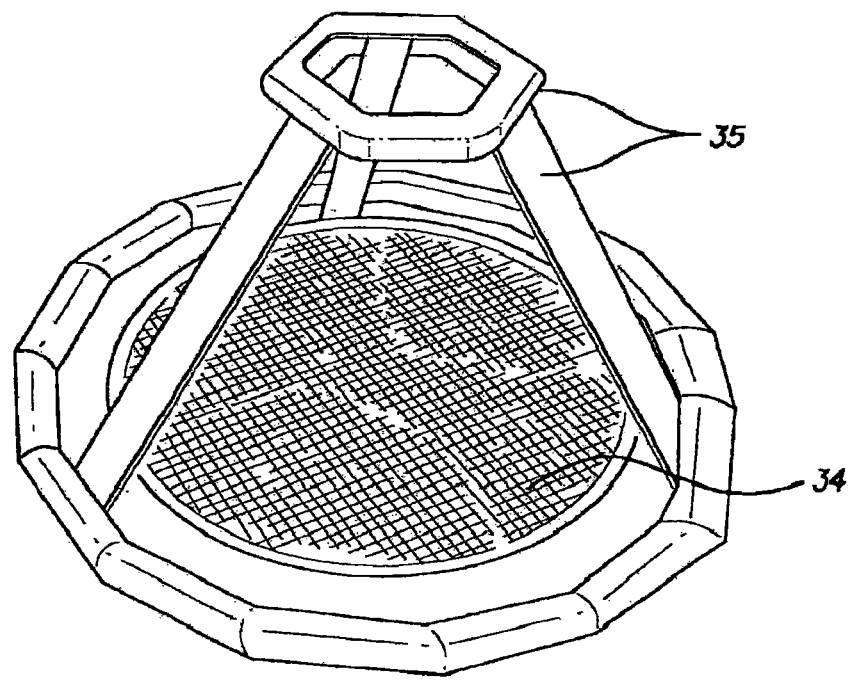
FIG. 5 illustrates a possible orbital redirector for use in the system.

The third option is a reflect-array 34 as illustrated in FIG. 5 (NASA (1999) Inflatable Reflectarray Antennas, NASA Tech Briefs, October 1999, http://wwvv.nasatech.com/Briefs/Oct99/NPO20433.html). This invention is an array of solid state microwave circuits that can receive a single intense beam of microwaves and divide that power directly into multiple outgoing microwave beams. The outgoing beams can be independently directed towards different targets. FIG. 5 is an illustration of a prior art prototype of a reflector array which re-configured may be used in the system of this invention. The prior art reflector array of FIG. 5 was demonstrated at Jet Propulsion Laboratory, Pasadena, Calif. in 1999. The device comprises a one meter diameter planar array of X-band micro-strip circuitry printed on a circular plastic membrane. The flexible membrane 34 is held flat by the inflated plastic torus 35.

Reflect-arrays eliminate large electrical currents that can interact with plasma in the magnetosphere. They can potentially approach 98% conversion efficiency of the primary power beam 24 into individually directed beams 26. A reflect-array will degrade slowly but can be repaired while in full operation. Reflect-arrays can eliminate the need for high precision physical antennas and greatly decrease the physical mass and complexity of the transmission system.

The beam redirector components for the reflect-array must be deployed from Earth and assembled in low orbit about the Earth. It will consist of low mass extensible trusses, similar to those used to support the solar arrays of the International Space Station. The trusses support the reflect-array printed circuitry that receives a power beam and then generates multiple independent power beams. Once assembled, the beam redirector can be deployed to high orbit about the Earth. This can be done by an ion-drive transport, such as proposed by W. Brown (Brown, W. C., A transportronic solution to the problem of interorbital transportation, NASA Contract NAS3-25066, Raytheon Corp., 166 pp.). A suitable cargo vessel can use an ion drive 36 such as illustrated in FIG. 6 (see Brown, W. C., supra). The cargo vessel would be permanently based in space. The vessel comprises low mass trusses 38, printed circuitry rectenna 40, and ion thrusters or rocket-like nozzles 42. Although the ion thrusters 42 are relatively large in FIG. 6, this is for illustration purposes only, and the thrusters 42 would be replaced in practice by hundreds of small individual thrusters. A known ion drive vessel is currently using solar energy to power the European SMART-1 spacecraft towards and into orbit about the Moon.

In the system according to the exemplary embodiment of the present invention, one or more cargo vessels 36 travel between low orbit about the Earth and deep space, and never return to the surface of Earth. Each vessel may be an ion drive vessel and is powered by the same microwave facilities 20 on Earth that are used to transfer natural source energy about the Earth. The microwave power received by the rectennas provides power for the ion drives. The ion drive vessel can also be used as a space tug by attaching it to a second vessel and powering it to a new trajectory.

The rectenna 40 of the cargo vessel would be around 220 m on a side. It may receive a beam of 400 $W/m^2$ from a succession of beaming sites along the Earth equator. This cargo vessel may be used to place beam redirectors 25 in high orbit about the Earth. A 1 km. diameter (or on a side) redirector would have a mass of around 300 tons. The redirector components would be built on Earth, launched on several flights of the space shuttle or space shuttle derived vehicles, and assembled in low Earth orbit. The redirector is then carried on a vessel 36 into the desired orbit.

This technique may be expanded to allow economical transportation of materials to the Moon for a lunar power station, which could supplement and eventually take over from Earth based power generation using fossil fuel sources. FIG. 7 illustrates a method of transporting equipment to the Moon for constructing a lunar power station of the type described in my two prior patents described above, using ion-drive cargo vessels 36 as illustrated in FIG. 6, or a flying wing vehicle of the type described in U.S. Pat. No. 4,836,470 of Criswell, the contents of which are incorporated herein by reference. Such a vehicle may be modified to incorporate an ion drive. Alternatively, a vehicle provided with a means for receiving an external propellant supply may be used, for example the vehicle described in U.S. Pat. No. 5,224,663 of Criswell, the contents of which are also incorporated herein by reference.

Figure 12:
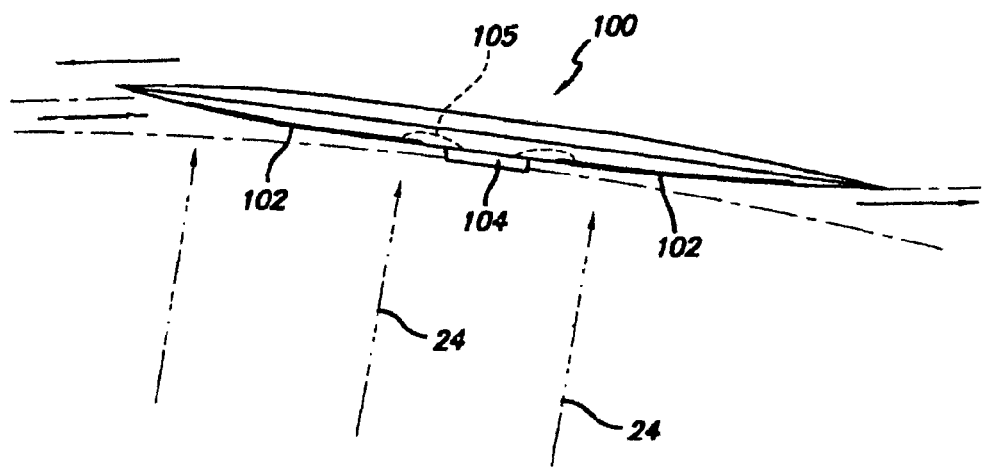
FIG. 12 illustrates an aerospace craft which can be powered by a microwave beam from the power distribution system of FIG. 8.
Figure 13:
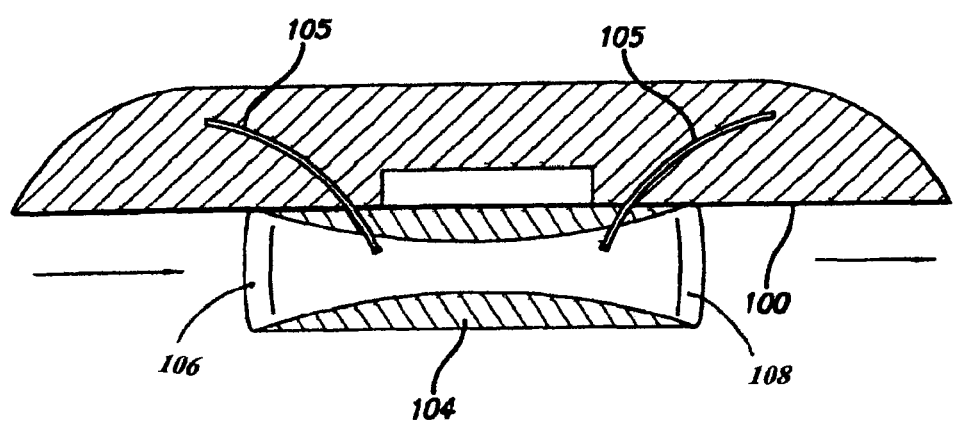
FIG. 13 is a cross section of the thrust chamber of the aerospace craft of FIG. 12.

FIGS. 12 and 13 illustrate a flying wing 100 which has rectennas 102 embedded in its bottom surface. These rectennas receive a power beam 24 from Earth and output electric power that is fed to engine 104 via leads or electric lines 105. An electric arc (see FIG. 13) generated by the electric power is used to heat the air that flows through engine 104 from entrance 106 to exit 108. The heated air exiting, the engine delivers thrust to the vehicle without the need for onboard propellants.

A microwave beam from one or more transmitter stations adjacent power stations on Earth may be directed to heat the atmosphere proximate to the vehicle to provide a propulsive mass to drive the vehicle out of Earth's atmosphere. The vehicle may be provided with an ion drive which can be powered directly by the microwave beam when the vehicle leaves Earth atmosphere. Once the vehicle arrives at Moon orbit, it may land to deliver the payload.

The microwave transmitters 20 about the Earth can power the same ion-drive cargo vessels used for deploying the redirectors 25 into low orbit 44 about the Moon 45, and then return them into low orbit 30 about the Earth. Material and equipment needed for construction of a lunar solar power collection and transmission system as schematically illustrated in FIG. 2 and described in my prior patents can be transported into low Earth orbit via space shuttle or similar vehicles, and loaded onto one or more ion-drive cargo vessels 36. Microwave power beams from Earth can be directed onto the rectenna 40 of each cargo vessel, providing power to the ion drive to convey the cargo vessel into low orbit about the Moon.

The basic energy or power transporting system illustrated in FIG. 3 completely eliminates the expense of safe transportation of natural gas in a liquefied form from its source to a power plant, and allows the energy produced by natural gas and other naturally occurring energy sources to be quickly redistributed to any desired location on the Earth. The system completely eliminates the need for gas liquefying and re-expanding facilities as well Earth-based transportation systems such as trucks, ships, trains, pipelines, and the like, which are expensive both to build and maintain.

With this system, the natural gas in a major field can be converted into electricity on site, and the electricity can then be converted into microwave power beams. This completely eliminates the cost of transporting the gas in its natural form. Each beam illuminates a redirector satellite 25, which then sends one or more microwave beams to rectennas 28 at appropriate locations. Power beaming avoids the liquefaction and transport of cryogenic gas onboard ships or through pipelines. The beamed power can then be re-directed, on a second-by-second basis, to the markets needing the power. Although particularly advantageous for transporting energy produced by natural gas or oil, the system may also be used for transport of energy from power stations fueled by coal or geothermal energy. Delivering energy by means of the power beam completely eliminates the need to control physical pollution from power production in the region that receives this clean power, and leads to reduced environmental damage and associated costs.

Figure 8:
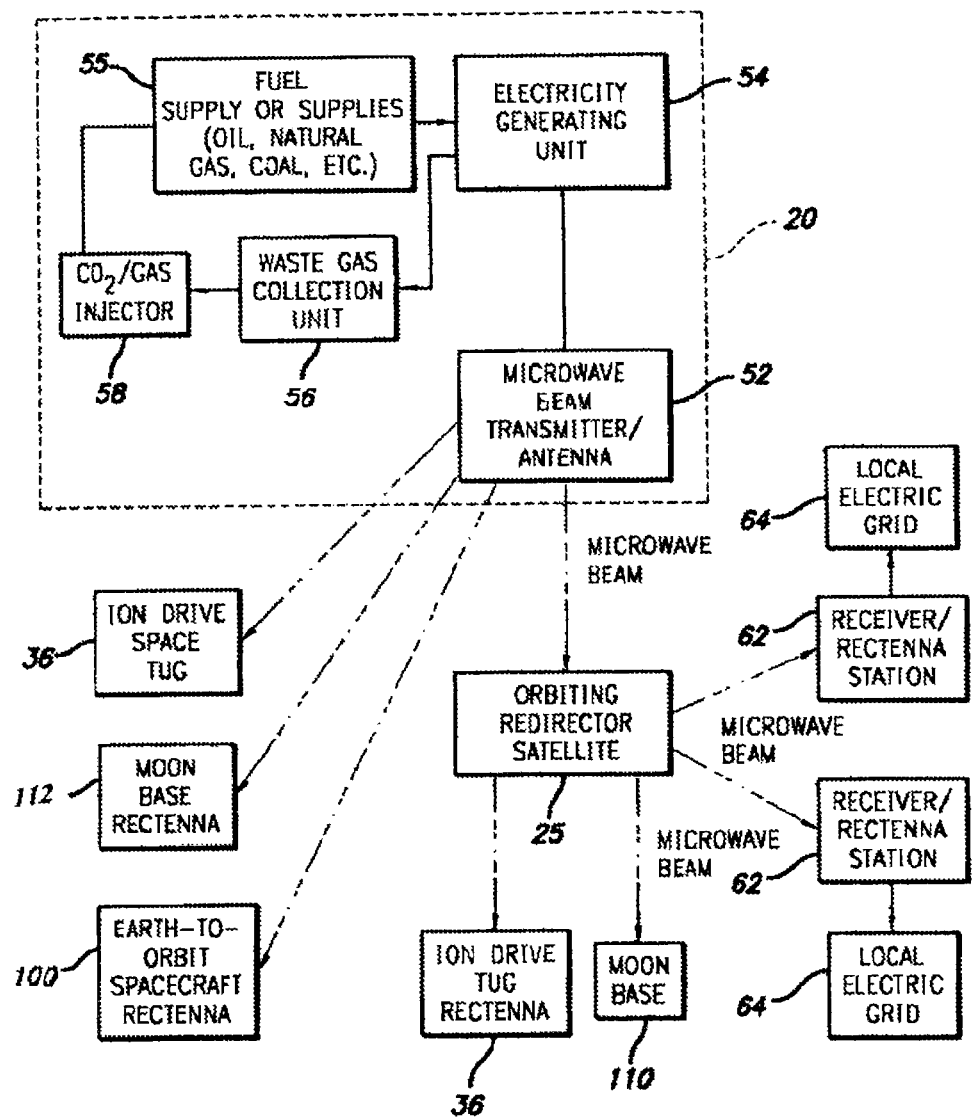
FIG. 8 is a block diagram of a power-generating and distribution system according to another embodiment of the invention.

FIG. 8 illustrates a modified power-generating and distribution system according to another embodiment of the invention. The system includes one or more unified facilities or stations 20 for power generation and microwave power transmission. As in the embodiment of FIG. 3, station 20 includes an electricity-generating unit 54 and a microwave power transmitter or antenna array 52 associated with the electricity-generating unit. The unit 54 is adjacent a natural fuel supply or power source 55. The electricity-generating unit, microwave beam transmitter, and/or fuel or power source may be as close together that they are touching one another, or may be spaced apart by 1,000 miles or more, although they are at a spacing of a few miles in the exemplary embodiment.

In this embodiment, the unified power facility also has a collection unit 56 for collecting waste gases such as carbon dioxide and pressurized gases or steam produced by the electricity-generating unit 54, and an injection device 58 for injecting the waste gases back into the buried fossil fuel supply 55, which may be an oil field, natural gas field, coal field or mine, or other fuel supply field in the region. The injector may return carbon dioxide, other waste gases and other materials to the original fuel supply field and/or to other natural fuel reservoirs that have been partially depleted. For example, reinjection of waste gases into a natural gas field does not enhance recovery. Therefore, if the primary fuel source is a natural gas field, collected waste gases may be transported and injected into an oil or coal field. This will result in enhanced recovery of fossil fuel from a depleted field, as well as reducing or eliminating pollution of the atmosphere as a result of gases which would otherwise be released from the electricity-generating unit. In order to further enhance fuel recovery, chemicals that release oil from porous rock can be manufactured using the power generated as well as chemicals released during power production.

The waste gas collection unit may capture carbon dioxide and other waste gases from the flue gas of an electric power plant, in a manner known in the field, and store the captured gas in tanks or the like. (See Herzog and Golomb, Carbon Capture and Storage from Fossil Fuel Use, The Encyclopedia of Energy, Vol. I, pages 277-287, Elsevier Inc. 2004). The injector may comprise a series of pumps and pipes for pumping the waste gases from the collection unit into the buried fossil fuel supply.

Sequestration of carbon dioxide, or long-term storage of carbon dioxide in underground reservoirs, has been proposed in order to reduce atmospheric pollution from power plants. Up to now, the fossil fuel industry has tended to consider sequestration of carbon dioxide as an undesirable expense which may restrict the electricity-generating business. It would be extremely expensive to capture carbon dioxide from the flue gas and then transport it back to the fossil fuel source for sequestration. The method and system of this invention provides for electricity generation at the same site as the fossil fuel source, so that it is much more economical to capture the flue gas and inject it back into the fossil fuel supply, such as an oil field. This will also have the benefit of enhanced oil or other fuel recovery, which more than counteracts the cost of the carbon dioxide capture and sequestration.

The upper limit of the spacing between the fuel or power source, electricity generating unit, and microwave transmitter is determined by the following performance criteria:

PERFORMANCE CRITERIA

Life Cycle $E_T$=Total amount of energy that can be extracted from the primary reservoir and/or
enhanced recovery reservoir.

$E_P$=Total energy required to build, maintain, operate and close down the gathering, generation, reinjection and beaming system. This includes energy consumed in meeting environmental requirements.

$E_D$=Energy delivered to the beam.

$E_D=E_T-E_P$ Must be positive or >0 for the system components to be "adjacent".

$E_P$=increases as the collection and reinjection systems increase in length and tonnage of materials transported over the life of the energy system.

"Adjacent" is limited by the requirement that $E_D>0$. This must be estimated for each system of fuel reservoirs, fuel collection systems, generation system, waste collection and transport and reinjection.

In the exemplary embodiment, the fuel or power source, electricity-generating unit, microwave transmitter and waste gas collector (if present) are contiguous or in relatively close proximity, i.e., at a spacing of no more than a few miles. However, it will be understood that these units may be at much larger spacings in other embodiments, as long as the requirement that $E_D>0$ is met.

As in the previous embodiment, the microwave transmitter 52 is controlled to direct one or more microwave beams to one or more orbiting redirector satellites 25, which then send one or more microwave beams to receivers or rectenna stations 62 at appropriate locations where power is delivered to a local electric grid 64. Both the redirector satellites 60 and the rectenna stations 62 may be identical to those described above in connection with the previous embodiment. The relatively simple rectennas of the receiver stations can be placed over deserts, shallow bays, industrial centers, or contaminated land. If placed over agricultural land, the rectennas can prolong the growing season and, as needed, release extra waste heat to protect against freezes. Transmitter 52 may also transmit power beams directly to an ion drive space tug 36, a rectenna within an Earth-to-orbit spacecraft 100, or directly to a lunar base rectenna 112 for powering lunar operations. Similarly, orbiting redirector satellites 25 may also transmit power beams to ion drive space tug rectennas 36, rectenna of Earth-to-orbit spacecraft 100 or directly to a lunar base rectenna 110.

Since the power distribution system of this invention is based in space, it does not intrude into diverse political regions where construction of a transportation system and protection of the system may be difficult. The system also does not require major physical assets that must be constructed, maintained, and protected. Power can be readily sold to both baseload and peak users. The system can also be enhanced to provide for transportation to and from low orbit about the Earth and beyond, and provides power for transporting payloads to the Moon for various construction purposes, such as construction of a lunar solar power station. The system may also be used to transmit power from a first lunar solar power station to a second lunar station which is currently on the dark side of the Moon, facing away from the sun. A microwave power beam from the first station is directed to an orbital redirector satellite, and a second microwave power beam may be directed from the satellite to the second station or relayed via a second redirector satellite if necessary.

The intensity of the microwave beam directed to each rectenna can be made approximately constant over the area of the rectenna. The arrangement is such that each rectenna station is positioned in the near field of the microwave beam, i.e. at a distance R which is less than about $D^2/\lambda$, where D is the diameter of the effective radiating aperture and $\lambda$ is the wavelength of the microwaves. The beam or beams emitted from the satellite can be electronically steered to one or more desired rectenna stations, as described in my U.S. Pat. No. 5,223,781 referenced above.

Figure 9:
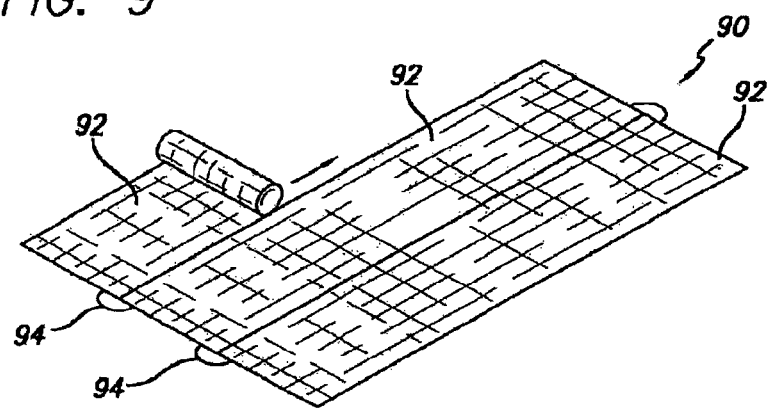
FIG. 9 illustrates a temporary rectenna system for providing a temporary power facility.

FIG. 9 illustrates a temporary rectenna facility 90 which may be set up as needed for temporary power requirements such as natural disasters, explorations of remote areas, or military applications. The rectenna facility comprises a plurality of panels 92 of woven electrically insulating material, such as a netting or a Mylar® applied with an appropriate conductive surface. The panels may be prefabricated and stored until needed. Cross connectors 94 may be provided between adjacent panels. A temporary power facility could be set up quickly and easily simply by laying the panels 92 on the ground, as indicated in FIG. 9. The location of the rectenna could then be identified to an orbiting redirector satellite at a suitable position, and a power beam could be quickly directed to the temporary rectenna. The temporary rectenna facility can also be set up on the Moon and receive power directly from transmitters on Earth or through redirector satellites 25. Other types of rectennas can also be employed and manufactured on the Moon.

Figure 10:
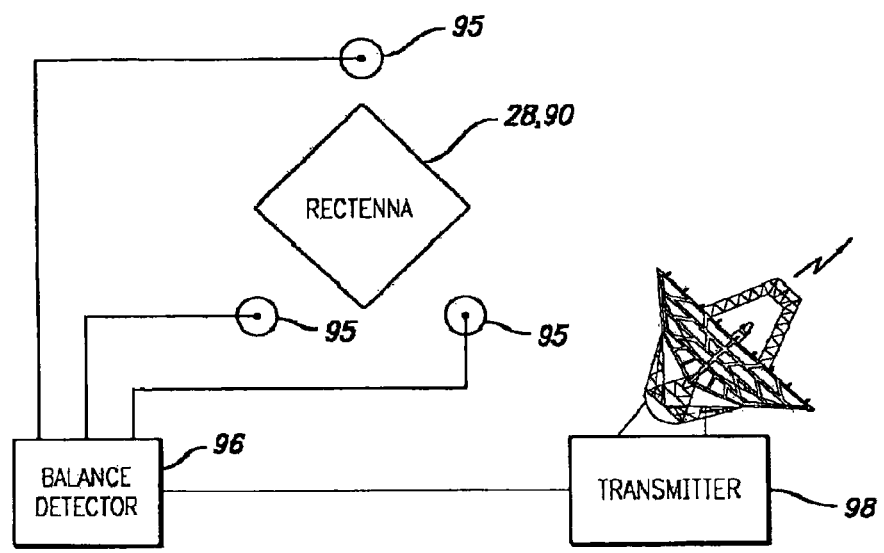
FIG. 10 illustrates a focus control system for use at a temporary or permanent rectenna facility forming part of the power distribution system.

FIG. 10 illustrates an automatic directional or focus control assembly for use at a permanent or temporary rectenna station 28, 62, or 90 for focusing the microwave beam at the desired rectenna site or sites. Signal detectors 95 are deployed in at least three locations about the perimeter of the rectenna station. The intensity of the incoming beam is monitored. Upon a detected imbalance of the incoming power beam by balance or variation detector 96, appropriate control signals and information on the direction and amount of the imbalance are transmitted to transmitter 98, which transmits signals to the satellite for making appropriate adjustments to the focus and direction of the transmission. Upon refocusing and/or redirecting of the incoming power beam, the detectors confirm the rebalance and proper orientation of the incoming beam. This feedback system ensures maintenance of proper focusing of the power beam onto the rectenna station. The detector system can also cut off the power beam.

Figure 11:
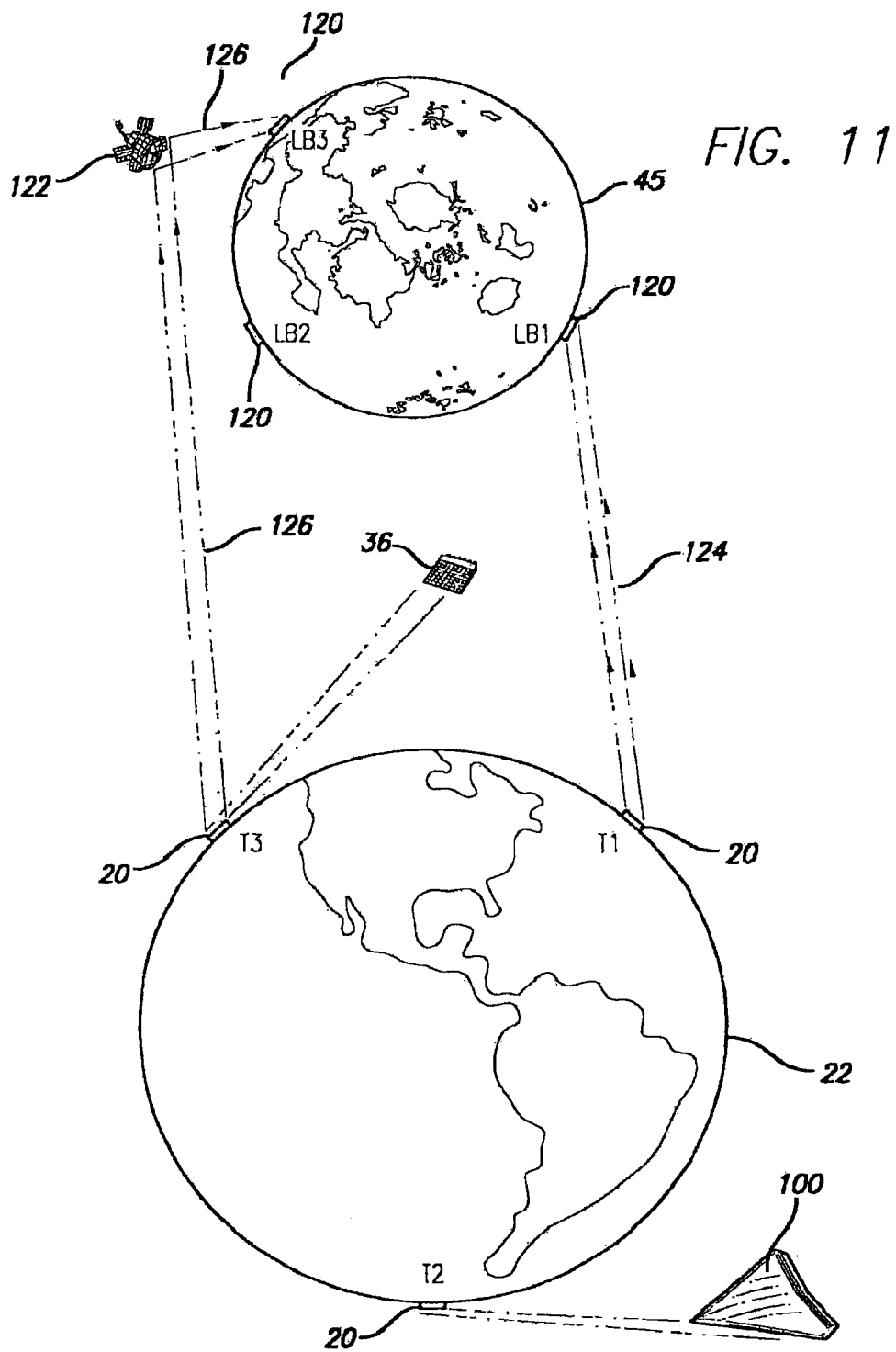
FIG. 11 illustrates a system according to another embodiment of the invention which uses the system of FIG. 8 to power lunar bases directly from Earth and also by means of redirected beams.

FIG. 11 is a schematic illustration of a system for powering lunar bases 120 from Earth, both directly via beams 124, and by means of beams 126 redirected from orbital beam redirectors 122. The beam redirectors 122 enable transmission of power to receivers or rectenna facilities 120 at lunar bases on the far side of the Moon at any time. For the purpose of this application, the far side of the Moon means the side facing away from the Earth at any instance in time, i.e. not in direct line of sight from the Earth or a satellite in orbit about the Earth. Power beams may also be directed to space tugs or transport vessels 36 between the Earth and the Moon, or orbiting the Earth or the Moon. Beam redirector satellites 122 about the Moon can also direct the beam to space tugs on the far side of the Moon. As indicated in FIG. 11, any transmitter 20 may also transmit power beams to power an aerospace plane or flying wing vehicle 100 as described above in connection with FIGS. 12 and 13.

An Earth-based power-generating and distribution system and method as described above has many advantages over conventional systems. This system can be used to electrically power transport systems between the Earth and the Moon and to power operations on the Moon, including operations for building lunar solar power stations.

The Earth-based system also has many advantages over current methods of distributing power to populated areas on Earth. Current major fuel sources for power generation are oil, coal, natural gas, nuclear fuels and biomass. One problem with fossil fuel sources is that they are often not found in convenient locations for immediate use in generating electricity, and often must be transported by pipelines, trains, ships, and other vehicles to a power plant for conversion into electricity, with associated risk of accidents or terrorism, and with huge expense. This contributes significantly to the high price of electricity. Another problem is that some fuel sources are in remote areas, contributing to the transportation expense. It is also difficult to recover a large amount of the fuel such as oil or natural gas, requiring expensive secondary or enhanced oil or gas recovery techniques. Finally, a significant percentage of a fuel such as natural gas is lost in liquefaction, handling, and transporting to the electricity-generating plant.

The unified power-generating and transmission system of FIG. 8 overcomes most or all of these problems. First, the power-generating plant can be located immediately adjacent the fuel source, eliminating the costs, dangers, and losses associated with transportation to a remote power-generating plant. This also means that the percentage of a fuel such as natural gas normally lost during transportation (typically around five percent) is retained and can be used directly to generate electricity. Second, the location of power generation and beaming facilities close to stranded gas or other fuel resources significantly reduces the cost of exploiting such sources. Third, by collecting waste gas, primarily carbon dioxide, created by the power-generating plant, and injecting the gas directly back into the adjacent oil or gas field, recovery of oil or gas can be increased at little additional expense. This technique also reduces pollutants released into the atmosphere. This type of facility makes injection of carbon dioxide or the like for enhanced fuel recovery more economically feasible, since the recovered waste gases do not have to be transported to a remote site, but can be re-injected on the spot into the adjacent fuel supply or bed.

The transmitter at the power-generating and distribution facility can be an open, grid-like surface as discussed above, which can allow the microwave beam to be transmitted through sunlight, rain, and wind. Careful design will permit fuel extraction and beaming facilities to have a minimum footprint on the land and to be readily removable when the fuel supply is exhausted.

The terrestrial power-generating and beaming system of this invention will provide a work force that is skilled in this field and can create a work force and business structure for expanding the system on Earth and also developing a lunar solar power station on the Moon. This system can potentially enable cost-effective implementation of a lunar solar power station which can convert solar power into microwaves for beaming to the same power receiving or rectenna stations on Earth which are used in the terrestrial system. The Earth-based power beaming facilities can be used to provide low cost power for space travel and transportation of materials to the Moon, as described above, as well as for directly beaming power to the Moon to provide electricity for lunar operations.

A major physical advantage of locating solar collectors on the Moon rather than the Earth is that mirrors can be used on the Moon to concentrate sunlight on the solar-to-electric converters, so that much less area of solar cell is needed per unit of power output. Orbiting solar reflectors are practical for the Moon due to the airless and cloudless lunar surface. The glass modules required to place 20 GWe/y of new commercial photovoltaic solar power systems on Earth, over 50 years is estimated to be of the order of 223,000 km$^2$/year. This is fifty four times the production of all sheet glass in the world in the year 2000. To provide 2 kWe/y would require the production of 520 m$^2$/year of glass modules, which is far beyond the per capita glass production in developed nations. Other specialty materials which could be used for solar converters are also not feasible due to the large solar cell area required on Earth, where solar concentrators are not practical. Such solar converters on Earth would require huge increases in terrestrial production of the specialty materials required. Thus, even though small scale solar energy collectors are feasible on the Earth, such systems are not able to provide significant affordable power in place of current non-renewable power sources, and cannot be expanded due to the material availability limitations.

FIG. 11 is a schematic illustration of a system for powering lunar bases 120 from Earth, for example, T1, T2 and T3 of FIG. 11 both directly via beams 124, and by means of beams 126 redirected from orbital beam redirectors 122. The beam redirectors 122 enable transmission of power to receivers or rectenna facilities 120 at lunar bases, for example, LB1, LB2 and LB3 of FIG. 11, on the far side of the Moon at any time. For the purpose of this application, the far side of the Moon means the side facing away from the Earth at any instance in time, i.e. not in direct line of sight from the Earth or a satellite in orbit about the Earth. Power beams may also be directed to space tugs or transport vessels 36 between the Earth and the Moon, or orbiting the Earth or the Moon. Beam redirector satellites 122 about the Moon can also direct the beam to space tugs on the far side of the Moon. As indicated in FIG. 11, any transmitter 20 may also transmit power beams to power an aerospace plane or flying wing vehicle 100 as described above in connection with FIGS. 12 and 13.

Other advantages of this system are that it will extend the useful life of oil fields and therefore increase the economic value to the field owners and power companies, such as ExxonMobil and nations such as the United States or Saudi Arabia, and that it will provide "greener" or more environmentally friendly power in a cost-effective manner. It can also enable synergistic use of several types of co-located power sources, and provide dependable load-following power at the local and regional grid level. The elimination of the need to transport potentially dangerous and explosive fuels about the Earth will reduce exposure to long-term legal liabilities, and also reduce the need to intrude such transportation systems into diverse political regions. The system reduces expense by significantly reducing the need for massive physical assets such as pipelines, ships, port facilities, power lines, and the like, that are difficult to maintain and protect.

Low cost electricity that is clean enables the economic production of fresh water from sea water or other brackish water and the recycling of consumer and agricultural water. Rectenna sites can be located in remote, unoccupied areas. Many industries, energy intensive farms, and fisheries can be located underneath or near rectenna sites.

Beamed power coming into the local biosphere from beyond Earth is environmentally neutral. It need not introduce net heat into the biosphere. Terrestrial transmitters that beam natural gas or oil energy from near the wells or other fossil fuel sources, enhanced by the beam redirector satellites, can open up areas to exploitation that are now off limits due to the difficulty in transporting natural gas or oil from such sites. By converting the fuel to electricity and then into one or more microwave beams on site, such transportation problems are completely eliminated. The rectenna sites which receive beamed power from the orbiting redirector satellites output pure electricity for direct consumption by customers. This system can significantly reduce the cost of electricity so that it could be made available to more people around the world. As the cost of electricity becomes cheaper, it will become more feasible to produce fuel such as hydrogen from water, and to make synthetic fuel, reducing the reliance on the fossil fuel supply which will inevitably become depleted.

The system of this invention is extremely versatile, since many different power beams may be emitted from many locations around the Earth, and directed to many different satellites and receiver or rectenna sites around the world, as well as into space for space transportation purposes, and directly to lunar bases. The microwave energy of this system has essentially no latency and can almost instantaneously be redirected as compared with the latency of oil in a pipeline, for example.

The centralized facilities adjacent fuel sources can be of larger capacity than local power stations and obtain an additional economy of scale. The problems of reduced demand at a local power station during the night are greatly reduced, since the power-generating station is remote from the local power grids. It can be operated at full capacity around the clock, simply directing power via the redirector satellites to rectenna sites where the power demands are greatest at any instant in time. The power is redistributed as needed during each twenty four hour period, as different parts of the world are in daytime and nighttime. This can potentially result in around 10% increase in gross revenue.

In the embodiment of FIG. 8 where waste gases are captured and injected into the oil or gas bed, the normal physical pollution (carbon dioxide, acid rain) associated with power plants is substantially reduced or eliminated. These pollution effects, in addition to dust and ash, are eliminated as issues for local government bodies, since the power facility is not located adjacent the population area. The risk of power plant failure and supply and capacity uncertainty is also eliminated as a local government issue. Instead, the only local facilities are the rectenna sites, where there is no pollution and little risk of accidents causing damage.

The terrestrial power transporting and distribution system of this invention, whether used alone or in conjunction with a lunar solar power station, completely eliminates the need for energy supply lines to ships and to land operations. It can provide energy at a more stable cost to civilian and defense interests. It also enables coded bi-static radar in which U.S. ships, planes and other facilities need not emit radar beams and can be completely stealthy. It also enables vastly greater continuous monitoring of global activities at very low cost, due to the reduced costs of placing monitoring stations in orbit.

Figure 14:
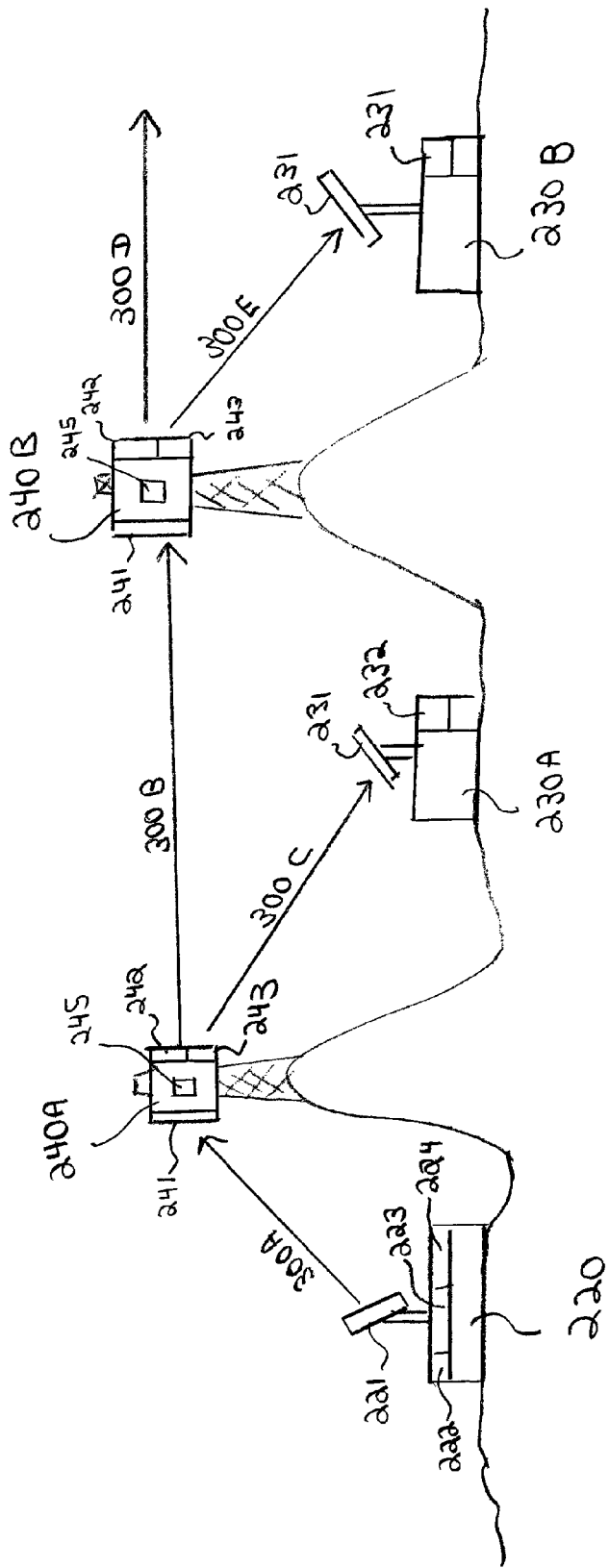
FIG. 14 illustrates a power distribution network incorporating a plurality of redirectors mounted on towers.

FIG. 14 illustrates another embodiment of the invention in which power is distributed among various ground-based transmitters, redirectors and receivers (with the redirectors mounted on towers or elevated structures), as follows. A first transmitter 220 may be a power generating station. Optionally, it may be located at the site of a natural fuel source, such as an oil or natural gas field, coal mine, geothermal reservoir, wind source, solar source, or the like. It is to be understood that the present invention may encompass a plurality of such transmitters 220, but only one is shown in this diagram which illustrates a portion of a larger network.

Transmitter 220 may optionally be connected to a local power grid. Transmitter 220 preferably includes: (i) a microwave transmitting antenna 221, (ii) a directional controller 222 for the microwave antenna, (iii) a beam focus controller 223 for the microwave antenna, and (iv) an power controller 224 for the microwave antenna. Directional controller 222 points transmitting antenna 221 in the correct direction. Beam focus controller 223 focuses the beam on its target, and power controller 224 ensures that the correct amount of power is sent to the beam's target. Preferably, beam focus controller 223 focuses the beam such that the minimum diameter of the beam at the receiver is smaller than the diameter of the receiver. It is to be understood that the present invention encompasses embodiments in which the diameter of the beam at the receiver is larger than the diameter of the receiver.

A plurality of ground-based microwave receivers 230A and 230B are also included. Receivers 230 each include: (i) a microwave receiving antenna 231 and (ii) a microwave to electricity converter 232. The antenna 231 receives microwave beams and the microwave to electricity converter 232 converts these microwave power beams into useful electricity. Optionally, receivers 230 may also be connected to a local power grid. Alternatively, receivers 230 may be connected to energy storage systems such as batteries, flywheels, pumped hydro, etc. for energy use at later times.

A plurality of microwave redirectors 240A and 240B are also included. In FIG. 14, each of these redirectors 240 are mounted onto towers as shown. Each redirector has at least one microwave receiver 241 and at least two microwave transmitters 242 and 243. The redirector microwave receiver 241 includes basically the same components that were in the ground-based receivers 220. The redirector microwave transmitters 242 and 243 each include the same components that were in the ground-based transmitters 220. Specifically, redirectors 240 include at least one microwave receiver 241 with a microwave to electricity converter, and at least two microwave transmitters 242 and 243 each having their own: (i) transmitting antenna, (ii) directional controller for the microwave antenna, (iii) a beam focus controller for the microwave antenna, and (iv) power controller for the microwave antenna. However, whereas receivers 230 convert the vast majority of the power they receive into electricity, redirectors 240 may only convert a very small portion of the power they receive into electricity as allocation and retransmission of the maximum power may be accomplished without conversion into electricity. This small amount of electricity is used to power and operate the redirector itself In addition, however, each redirector 240 further includes a received power to plurality of transmitters and redirector power allocation controller 245. Controller 245 determines the amount of power to be sent to each of the various other stations or nodes. For example, power allocation controller 245 in redirector 240A determines the percentages of received power to be sent to each of receiver 230A and redirector 240B, respectively.

In operation, microwave power is beamed from transmitter 220 to redirector 240A (as beam 300A). In accordance with the present invention, redirector 240A then sends focused microwave power beams to at least two other "stations". These stations may optionally include a microwave receiver 230A or a second redirector 240B. This process can be repeated throughout the network. As such, redirector 240A may send power beam 300B to redirector 240B and may send power beam 300C to receiver 230A. It is to be understood that beams 300B and 300C may be sent at the same time, or at different times.

Second redirector 240B then sends out a plurality of focused power beams to at least two other stations. For example, power beam 300D may be sent to another redirector (not shown); and power beam 300E may be sent to a second receiver 230B. As can be seen, the present system provides a network through which power can be distributed from (one or more) ground-based transmitters 220 to (one or more) ground-based receivers 230. Importantly, each redirector 240 has the capacity to send out multiple beams to different stations. As such, a true network is provided since power can be sent back and forth in many different pathways among a large number of ground-based transmitters and receivers 220 and 230. As illustrated, redirectors 240 may be mounted on towers such that power may thus be transmitted over land from transmitter 220 to each of receivers 230A and 230B.

Figure 15:
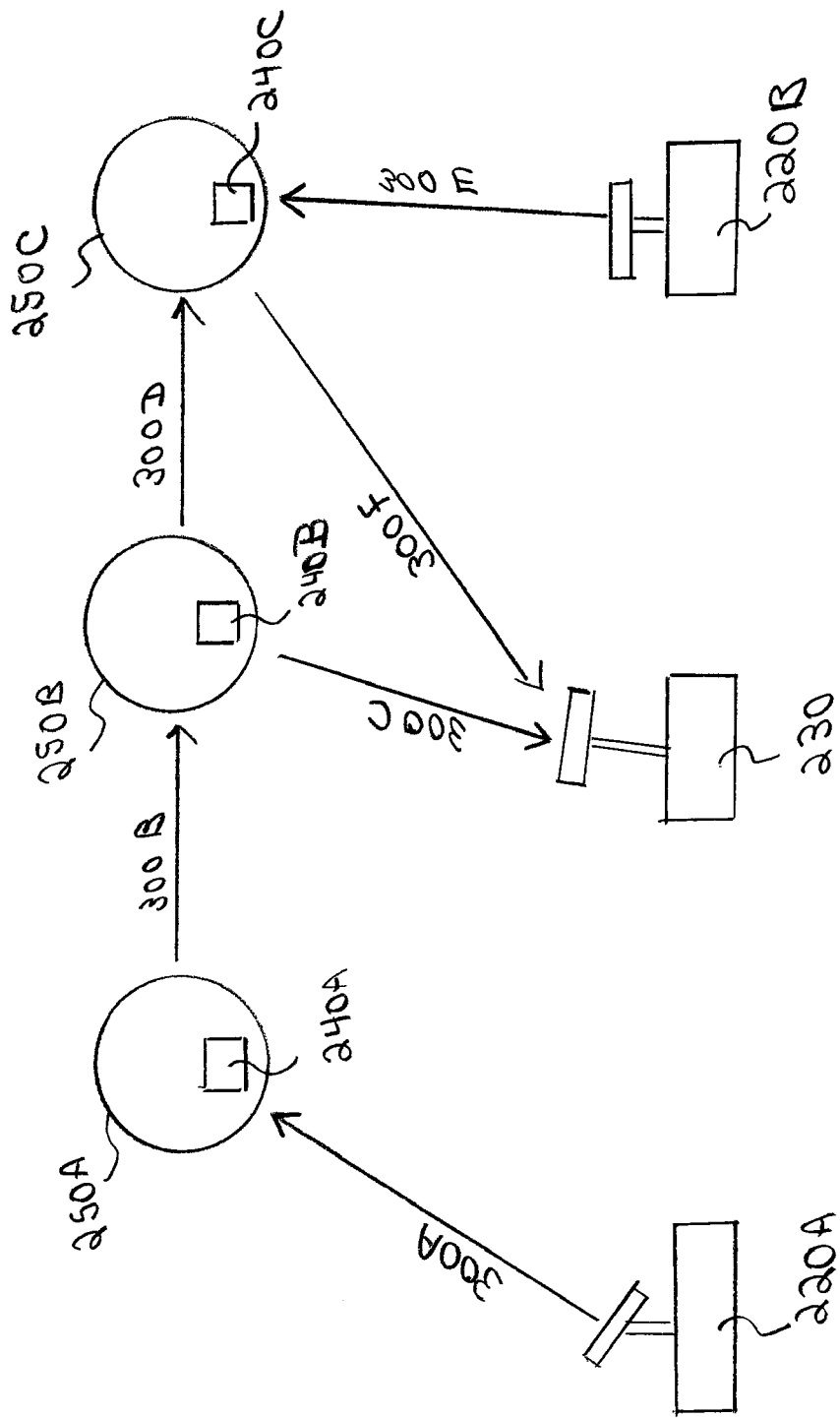
FIG. 15 illustrates a power distribution network incorporating a plurality of redirectors mounted on balloons.

FIG. 15 illustrates another embodiment of the invention in which the redirectors 240 are instead positioned on or in balloons 250A, 250B and 250C. Balloons 250A, 250E and 250C may be tethered to the ground. The advantage of positioning redirectors 240 on balloons 250 (as opposed to on towers as in FIG. 14) is that the balloons can be positioned much farther away from the ground such that they do not need to be positioned as close together as the towers (due to greater line of sight than can be provided away from the ground).

In FIG. 15, power transmitter 220A sends a focused microwave beam 300A to redirector balloon station 250A. Redirector balloon station 250A then sends a focused microwave power beam 300B to a second redirector balloon station 250B which in turn sends a focused microwave power beam 300D to a third redirector balloon station 250C. In addition, however, second redirector balloon station 250B also sends a focused microwave power beam 300C to microwave receiver 230. A second transmitter 220B transmits a microwave power beam 300E to third redirector balloon station 250C. As can be seen, third redirector balloon station 230C may also send a microwave power beam to receiver 230. (Note: receiver 230 will likely be receiving beams 330C or 300F at different times since its antenna 231 would likely have to be repositioned. However, the present invention also encompasses embodiments in which a ground-based power receiver 230 has multiple antennae and it thus able to receive power from different redirectors 240 simultaneously).

As can be seen, each of the second and third redirector balloon stations 250B and 250C are capable of transmitting a plurality of microwave power beams towards more than one station. This is because each of the redirectors 240 in FIG. 15 are similar to the redirectors of FIG. 14 and preferably comprise at least one microwave receiver 241 and at least two microwave transmitters 242 and 243 (not shown). The end result of the illustrated exemplary network is that power is transmitted from transmitters 220A and 220B to receiver 230.

Figure 16:
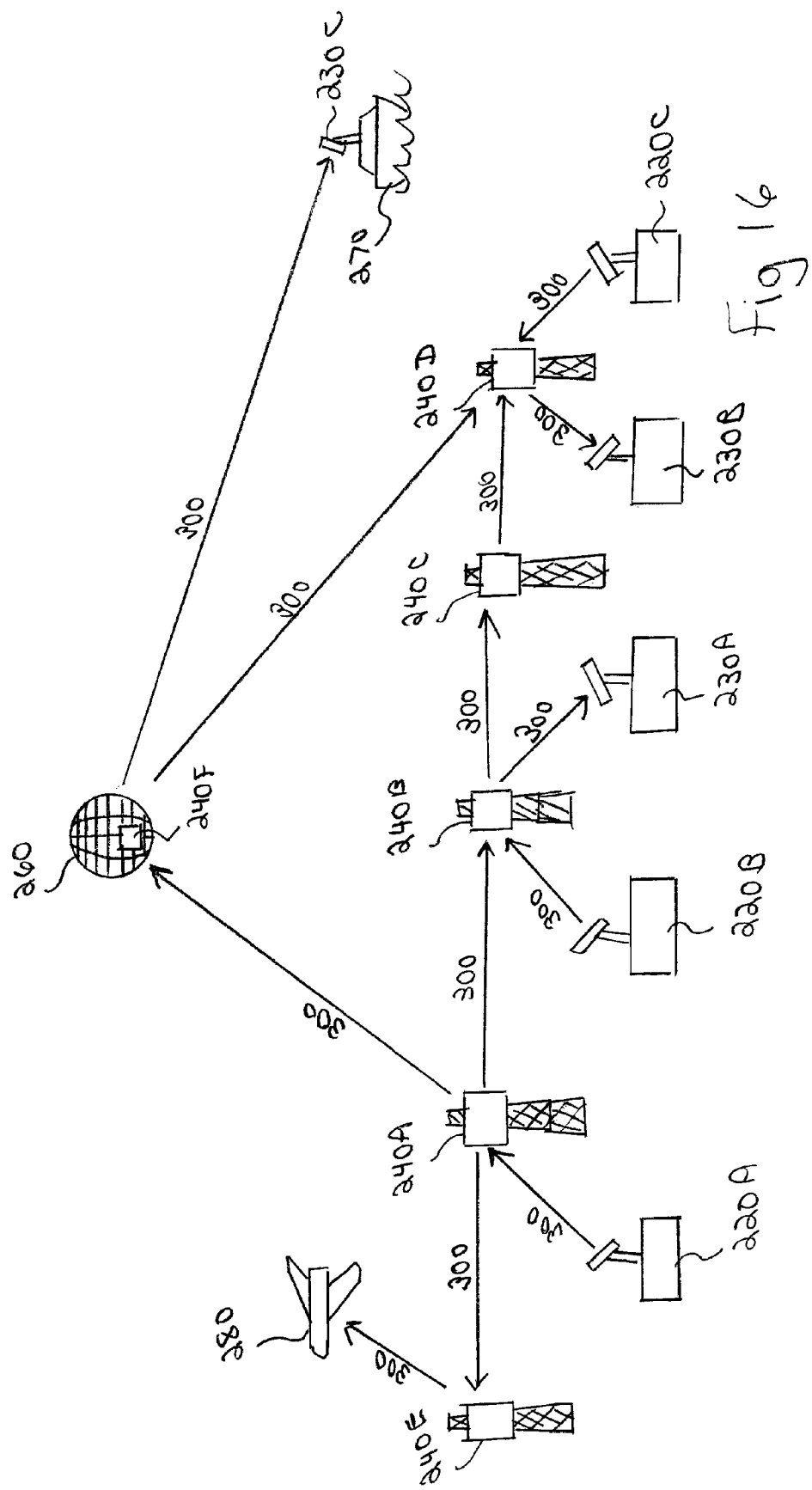
FIG. 16 illustrates a complex power distribution network incorporating redirectors mounted on towers and balloons, and microwave receivers on both boats and aircraft.

FIG. 16 illustrates another complex exemplary power distribution network. In this network, power is transmitted from transmitters 220A, 220B and 220C to ground based receivers 230A and 230B. The direction of the various microwave power beams 300 passing between various stations (i.e.: transmitters 220, redirectors 240 and receivers 230) is shown. These stations act as the nodes of the power distribution network. As can be seen, redirector 240A receives power from transmitter 220A and redirects it to each of redirectors 240E, 240B and satellite redirector 260. Redirector 240B receives power beams from redirector 240A and from power source transmitter 220B. Redirector 240B then sends out power beams both to receiver 240C and receiver 230A. Redirector 240C receives power beams from redirector 240B and simply sends it on to redirector 240D. Redirector 240D receives power beams from redirector 240C and from transmitter 220C and sends power to receiver 230B. In addition, a redirector 240F is positioned on or in an orbiting satellite 260. An advantage of positioning a redirector on satellite 260 is that power can be transmitted from redirector 240A to redirector 240D while bypassing redirectors 240B and 240C if desired.

Yet another feature seen in FIG. 16 is that a receiver 230C is positioned on a ship 270. Thus, power can be transmitted from ground-based sources (at transmitters 220) to a boat, ship or floating ocean platform. Ship 270 may be fully or partially powered by the microwave power it receives. As illustrated, some of the power ship 270 receives may come from the redirector 240F in satellite 260. The use of redirectors in satellites is especially helpful when the ships are far from land. In addition, redirector 240E sends a microwave power beam to a microwave powered aircraft 280. Microwave aircraft 280 may be fully or partially powered by the microwave power it receives. Instead of a microwave aircraft, a microwave powered missile or airship, may also be used. In addition, power sent to the ship receiver 230C or aircraft receiver can further be redirected to extend the network.

FIG. 17 illustrates another exemplary embodiment of the invention in which four separate power source transmitters 220A, 220B, 220C and 220D send their power beams to tower redirectors 240A and 240B and to orbiting satellite 260. In turn, redirectors 240A, 240B and 240C (in orbiting satellite 260) all send directed focused power beams towards the same target (being an incoming hostile missile 275). Thus, the present power distribution system can also be used as a national security defense system. Moreover, in accordance with the present invention, power beams may be sent to a plurality of redirectors in various satellites, and from there the beams may all be redirected such that they focus on the same target, for example an asteroid approaching the earth (thus providing a planetary defense system).

It is to be understood that the embodiments of the invention illustrated in FIGS. 14 to 17 are merely examples and that many other system configurations are included within the scope of the present invention. Importantly, however, the present invention broadly covers the concept of microwave redirectors that transmit focused power beams to at least two different stations. Thus, each of the plurality of microwave redirectors are configured to independently focus the power beams that are sent to at least two stations. These stations (i.e.: network nodes) may either be other microwave redirectors or ground, air, space or water-based microwave receivers or redirectors.

In each of the above-described examples, some or all of the transmitting antennae 221 may be phased array transmitters. The directed and focused power beams sent from these antennae may preferably be near-field energy beams. (Although the present invention encompasses far-field energy beams as well). Preferably as well, each phased array transmitter antenna may have a radiating aperture dimensioned such that the diameter of the phased array transmitter squared divided by the wavelength of a microwave beam send by the phased array transmitter is greater than the separation distance between the transmitter and its corresponding receiver.

Also in accordance with the present invention, a communications system among all of the transmitters 220, receivers 230 and redirectors 240 is provided. This communication system sends information to each transmitter, receiver and redirector such that the operational status of each transmitter, receiver and redirector can be known at any place in the network. In addition, the operation of the various stations (transmitters, receivers and redirectors) can preferably be controlled remotely. For example, the operation of the redirectors and receivers can be controlled from one or more transmitters etc.) In preferred aspects, the information transmitted by the communication system may be transmitted by modulating the various power beams passing among the stations in the network. Optionally as well, communication may be carried out by modulated laser beams that are reflecting off of receivers and returned back to their transmitters. In further optional embodiments, the communication system may include components and systems currently found in digital cell phone telephony.

FIG. 18 illustrates power being transmitted from a transmitter to a receiver showing a laser alignment system to ensure the transmitter and receiver point towards one another, as follows. A ground-based microwave transmitter 400 is provided. Transmitter 400 includes an antenna 402, a directional controller 404, a beam focus controller 406, and an amplitude controller 408. A moveable linkage 410 is controlled by directional controller 404 or manual control for pointing antenna 402 in the correct direction. Also included is a ground-based microwave receiver 500; having: an antenna 502 and a directional controller 504. A moveable linkage 510 is controlled by directional controller 504 for pointing antenna 502 in the correct direction. Specifically, antennae 402 and 502 are oriented to face one another such that ground-based microwave transmitter 400 sends a directed and focused power beam to the ground-based microwave receiver 500. Antenna 402 may optionally be a phased array transmitter or a parabolic transmitter.

The invention illustrated in FIG. 18 operates as a "wireless extension cord" as power from a wall outlet (or other suitable power source) 401 is transmitted to receiver 500 where it can then be output at plug in outlet 501. As such, electricity received from outlet 401 can be converted to microwaves by electricity to microwave converter 403 prior to being beamed out of antenna 402. Similarly, microwave beams received by antenna 502 are converted to useful electricity by microwave to electricity converter 503 prior to being fed out of plug in outlet 501.

Directional controller 404 points antenna 402 towards antenna 502, and directional controller 504 points antenna 502 towards antenna 402. To ensure that antennae 402 and 502 point towards one another, a laser alignment system 450 may also be included. Laser alignment system 450 may include a laser source 451 on the microwave antenna 402, a laser reflector 452 on the microwave antenna 502, and a laser beam detector 453 on the microwave antenna 402. In operation, laser beam detector 453 detects the laser beam sent from laser source 451 that is reflected back from laser reflector 452.

Optionally, a communications system between transmitter 400 and receiver 500 may be included. This communication system can simply comprise information transmitted between the transmitter and the receiver by modulating the laser beam sent from laser source 451. Alternatively, communication (from the transmitter to the receiver) can be achieved by modulating the microwave beams sent from the transmitter to the receiver.

FIG. 19 is similar to FIG. 18 but shows that the present system can be configured for RF as well as microwave transmissions. This is true for all embodiments and configurations of the present invention.

Lastly, FIG. 20 illustrates a hybrid of various systems illustrated herein with a power transmitter 220, a redirector 240 and a plurality of receivers 230A and 230B. Power transmitter 220 has a directional controller 222 (the focusing and amplitude controllers are not seen in this illustration). It's antenna 221 transmits power to the receiving antenna 241 of redirector 240. Redirector 240 then sends beams with its own antennae 242 and 243 to power receivers (i.e.: end users) 230A and 230B, respectively. Optionally, however, a plug in outlet (similar in function to 501 in FIGS. 18 and 19) can also be included to extract local power. Each of receivers 230 have their own receiving antenna 231 for receiving the power, and may include directional controllers similar to 504 in FIGS. 18 and 19 (for aiming antennae 231 towards antennae 242 and 243 respectively). A microwave to electricity converter (similar to 503 in FIGS. 18 and 19) may also be included for providing power at a local outlet (similar to 501 in FIGS. 18 and 19). Thus, power received from plug-in outlet 401 is thus transmitted to each of the two local outlets 501.

Although some exemplary embodiments of the invention have been described above by way of example only, it will be understood by those skilled in the field that modifications may be made to the disclosed embodiments without departing from the scope of the invention, which is defined by the appended claims.

What is claimed is:

1. A power distribution network, comprising:
   (a) at least one ground-based microwave transmitter, having:
      (i) a microwave transmitting antenna,
      (ii) a microwave transmission directional controller for the microwave transmitting antenna,
      (iii) a microwave transmission focus controller for the microwave transmitting antenna, and
      (iv) a microwave transmission power controller for the microwave transmitting antenna;
   (b) a plurality of ground-based microwave receivers, each having:
      (i) a microwave receiving antenna,
      (ii) a microwave to electricity converter;
   (c) one or more microwave redirectors, having:
      (i) at least one microwave receiver, having:
         (A) a microwave receiving antenna, and
         (B) a microwave to electricity converter;
      (ii) a plurality of microwave transmitters, each having:
         (A) a microwave transmitting antenna,
         (B) a microwave transmission directional controller for the microwave transmitting antenna,
         (C) a microwave transmission focus controller for the microwave transmitting antenna,
         (D) a microwave transmission power controller for the microwave transmitting antenna, and
      (iii) a received power to plurality of transmitters and redirector power allocation controller;
   wherein a first ground-based microwave transmitter transmits a directed and focused power beam transmission to a first microwave redirector, and
   wherein the first microwave redirector receives the power beam transmission from the first ground-based microwave transmitter and transmits directed and focused power beam transmissions to a plurality of stations selected from the plurality of microwave redirectors and the plurality of ground-based microwave receivers, and
   wherein the first microwave redirector allocates power both to itself and to the plurality of stations to which power is transmitted.

2. The power distribution network of claim 1, wherein at least one microwave redirector is airborne.

3. The power distribution network of claim 1, wherein at least one microwave redirector is mounted on a tower.

4. The power distribution network of claim 1, further comprising:
   (d) a space-based microwave redirector,
   wherein the first ground-based microwave transmitter transmits a focused power beam to the space-based microwave redirector, or
   wherein one of the microwave redirectors transmits power to the space-based microwave redirector.

5. The power distribution network of claim 1, wherein the directed and focused power beams are near-field energy beams.

6. The power distribution network of claim 1, wherein at least one of the plurality of microwave redirectors send power to the stations at different times.

7. The power distribution network of claim 1, wherein at least one of the plurality of microwave redirectors send power to the stations at the same time.

8. The power distribution network of claim 1, wherein at least one of the plurality of ground-based microwave transmitters are coupled to an electrical power grid.

9. The power distribution network of claim 1, wherein at least one of the plurality of ground-based microwave receivers are coupled to an electrical power grid.

10. The power distribution network of claim 1, wherein each of the microwave redirectors convert a percentage of microwave power received into electricity to power the microwave redirector.

11. The power distribution network of claim 1, wherein each of the plurality of microwave redirectors are configured to direct power beams towards the same target.

12. The power distribution network of claim 1, wherein each of the plurality of microwave redirectors are configured to independently focus the power beams that are sent to at least two stations.

13. The power distribution network of claim 1, further comprising:
   (d) a water-based microwave receiver,
   wherein one of the microwave redirectors transmits power to the water-based microwave receiver.

14. The power distribution network of claim 1 wherein the at least one microwave receiver and the plurality of microwave transmitters of the one or more microwave re-directors is a reflex array.

15. The power distribution network of claim 1, wherein at least one microwave redirector is positioned on a balloon.

16. The power distribution network of claim 15, wherein the balloon is tethered to the ground.

17. The power distribution network of claim 1, wherein each microwave transmitting antenna is a phased array transmitter.

18. The power distribution network of claim 17, wherein each phased array transmitter has a radiating aperture dimensioned such that the diameter of the phased array transmitter squared divided by the wavelength of a microwave beam send by the phased array transmitter is greater than the separation distance between the transmitter and its corresponding receiver.

19. The power distribution network of claim 18, wherein the minimum diameter of the beam at the receiver is smaller than the diameter of the transmitter.

20. The power distribution network of claim 1, further comprising:
   (d) a flying microwave receiver,
   wherein the first ground-based microwave transmitter transmits a focused power beam to the flying microwave receiver, or
   wherein one of the microwave redirectors transmits power to the flying microwave receiver.

21. The power distribution network of claim 20, wherein the flying microwave receiver is a microwave powered aircraft.

22. The power distribution network of claim 20, wherein the flying microwave receiver is a microwave powered missile.

23. The power distribution network of claim 1, further comprising:
   a communications system among the ground-based microwave transmitter and receivers and the microwave redirectors, wherein the communications system sends information to each transmitter, receiver and redirector such that the operational status of each transmitter, receiver and redirector can be known at any place in the network.

24. The power distribution network of claim 23, wherein information is transmitted by modulating the power beams passing among the stations in the network.

25. A power distribution system, comprising;
a source of microwave energy;
- (a) a ground-based microwave transmitter for transmitting the microwave energy, the transmitter having:
  - (i) a directional controller;
  - (ii) a beam focus controller;
  - (iii) an amplitude controller; and
- (b) a ground-based microwave receiver for receiving the microwave energy, the receiver having:
  - (i) a directional controller, and
  - (ii) a converter for converting the received microwave energy into electricity, and
- (c) an alignment system having:
  - (i) an alignment source of alignment electromagnetic radiation coupled to the microwave transmitter for transmitting the alignment radiation,
  - (ii) an alignment reflector of the alignment electromagnetic radiation coupled to the microwave receiver, and
  - (iii) an alignment controller signal generator within the alignment reflector, which detects alignment error and transmits the alignment error to an alignment receiver coupled to the transmitter for communication with the directional controllers and the beam focus controllers of the transmitter;

wherein the ground-based microwave transmitter sends a directed and focused power beam directly to the ground-based microwave receiver.

26. The power distribution system of claim 25, wherein the directional controller of the ground-based microwave transmitter points the ground-based microwave transmitter towards the ground-based microwave receiver, and
wherein the directional controller of the ground-based microwave receiver points the ground-based microwave receiver towards the ground-based microwave transmitter.

27. The power distribution system of claim 25, wherein the ground-based microwave transmitter is a phased array transmitter.

28. The power distribution system of claim 25, wherein the ground-based microwave transmitter is a parabolic transmitter.

29. The power distribution system of claim 25, where in the alignment electromagnetic radiation is columnated light.

30. The power distribution system of claim 25, wherein the alignment reflector modulates alignment error onto the reflected alignment radiation.

31. The power distribution system of claim 25, wherein the ground-based receiver further includes an allocator that allocates the incoming microwave energy into one or more output energy quantities responsive to the needs of one or more energy destinations and one or more secondary re-transmitters associated with the one or more allocated energy quantities with each re-transmitter including a respective directional controller, a respective focused controller and a amplitude controller for transmitting the respective energy quantities to the respective destinations of respective receivers for the destinations or for further transmission.

32. A power distribution system, comprising;
a source of electricity,
an electricity to microwave converter,
a transmitter for transmitting the microwaves,
a receiver for receiving the microwaves directly from one or more transmitters,
a microwave to electricity converter,
the transmitter having directional adjustments in at least two spacial dimensions,
a source of alignment-electromagnetic radiation coupled to the transmitter that is coincident with the direction of the transmitter microwaves which illuminates the receiver.

33. The power distribution system of claim 32 wherein the transmitter includes an amplitude controller for controlling the amplitude of the received microwave energy to a magnitude of between 20 and 25 watts per square foot.

34. The power distribution system of claim 32 wherein the source of alignment-electromagnetic radiation is a laser.

* * * * *

UNITED STATES PATENT AND TRADEMARK OFFICE
CERTIFICATE OF CORRECTION

PATENT NO. : 8,596,581 B2  
APPLICATION NO. : 13/323585  
DATED : December 3, 2013  
INVENTOR(S) : David R. Criswell and Jori L. Petersen Page 1 of 4

It is certified that error appears in the above-identified patent and that said Letters Patent is hereby corrected as shown below:

In the Claims

Claim 3, column 21, beginning at line 46 should read as follows:
"3. The power distribution network of claim 1, wherein at least one microwave redirector is positioned on a balloon."

Claim 4, column 21, beginning at line 48 should read as follows:
"4. The power distribution network of claim 3, wherein the balloon is tethered to the ground."

Claim 5, column 21, beginning at line 56 should read as follows:
"5. The power distribution network of claim 1, wherein at least one microwave redirector is mounted on a tower."

Claim 6, column 21, beginning at line 59 should read as follows:
"6. The power distribution network of claim 1, wherein each microwave transmitting antenna is a phased array transmitter."

Claim 7, column 21, beginning at line 62 should read as follows:
"7. The power distribution network of claim 1, further comprising: (d) a space-based microwave redirector, wherein the first ground-based microwave transmitter transmits a focused power beam to the space-based microwave redirector, or wherein one of the microwave redirectors transmits power to the space-based microwave redirector."

Claim 8, column 21, beginning at line 65 should read as follows:
"8. The power distribution network of claim 1, further comprising: (d) a flying microwave receiver, wherein the first ground-based microwave transmitter transmits a focused power beam to the flying microwave receiver, or wherein one of the microwave redirectors transmits power to the flying microwave receiver."

Signed and Sealed this  
Twentieth Day of May, 2014

Michelle K. Lee  
*Deputy Director of the United States Patent and Trademark Office*

CERTIFICATE OF CORRECTION (continued)

U.S. Pat. No. 8,596,581 B2

Claim 9, column 22, beginning at line 1 should read as follows:
"9. The power distribution network of claim 8, wherein the flying microwave receiver is a microwave powered aircraft."

Claim 10, column 22, beginning at line 4 should read as follows:
"10. The power distribution network of claim 8, wherein the flying microwave receiver is a microwave powered missile."

Claim 11, column 22, beginning at line 8 should read as follows:
"11. The power distribution network of claim 1, wherein the directed and focused power beams are near-field energy beams."

Claim 12, column 22, beginning at line 12 should read as follows:
"12. The power distribution network of claim 1, wherein at least one of the plurality of microwave redirectors send power to the stations at different times."

Claim 13, column 22, beginning at line 16 should read as follows:
"13. The power distribution network of claim 1, wherein at least one of the plurality of microwave redirectors send power to the stations at the same time."

Claim 14, column 22, beginning at line 21 should read as follows:
"14. The power distribution network of claim 1, wherein at least one of the plurality of ground-based microwave transmitters are coupled to an electrical power grid."

Claim 15, column 22, beginning at line 25 should read as follows:
"15. The power distribution network of claim 1, wherein at least one of the plurality of ground-based microwave receivers are coupled to an electrical power grid."

Claim 16, column 22, beginning at line 27 should read as follows:
"16. The power distribution network of claim 1, wherein each of the microwave redirectors convert a percentage of microwave power received into electricity to power the microwave redirector."

Claim 17, column 22, beginning at line 29 should read as follows:
"17. The power distribution network of claim 6, wherein each phased array transmitter has a radiating aperture dimensioned such that the diameter of the phased array transmitter squared divided by the wavelength of a microwave beam send by the phased array transmitter is greater than the separation distance between the transmitter and its corresponding receiver."

Claim 18, column 22, beginning at line 32 should read as follows:
"18. The power distribution network of claim 17, wherein the minimum diameter of the beam at the receiver is smaller than the diameter of the transmitter."

Claim 19, column 22, beginning at line 39 should read as follows:
"19. The power distribution network of claim 1, wherein each of the plurality of microwave redirectors are configured to direct power beams towards the same target."

CERTIFICATE OF CORRECTION (continued)
U.S. Pat. No. 8,596,581 B2

Claim 20, column 22, beginning at line 42 should read as follows:
"20. The power distribution network of claim 1, wherein each of the plurality of microwave redirectors are configured to independently focus the power beams that are sent to at least two stations."

Claim 21, column 22, beginning at line 50 should read as follows:
"21. The power distribution network of claim 1, further comprising: a communications system among the ground-based microwave transmitter and receivers and the microwave redirectors, wherein the communications system sends information to each transmitter, receiver and redirector such that the operational status of each transmitter, receiver and redirector can be known at any place in the network."

Claim 22, column 22, beginning at line 53 should read as follows:
"22. The power distribution network of claim 21, wherein information is transmitted by modulating the power beams passing among the stations in the network."

Claim 23 column 22, beginning at line 56 should read as follows:
"23. The power distribution network of claim 1, further comprising: (d) a water-based microwave receiver, wherein one of the microwave redirectors transmits power to the water-based microwave receiver."

Claim 24, column 22, beginning at line 65 should read as follows:
"24. A power distribution system, comprising; a source of microwave energy; (a) a ground-based microwave transmitter for transmitting the microwave energy, the transmitter having: (i) a directional controller; (ii) a beam focus controller; (iii) an amplitude controller; and (b) a ground-based microwave receiver for receiving the microwave energy, the receiver having: (i) a directional controller, and (ii) a converter for converting the received microwave energy into electricity, and (c) an alignment system having: (i) an alignment source of alignment electromagnetic radiation coupled to the microwave transmitter for transmitting the alignment radiation, (ii) an alignment reflector of the alignment electromagnetic radiation coupled to the microwave receiver, and (iii) an alignment controller signal generator within the alignment reflector, which detects alignment error and transmits the alignment error to an alignment receiver coupled to the transmitter for communication with the directional controllers and the beam focus controllers of the transmitter; wherein the ground-based microwave transmitter sends a directed and focused power beam directly to the ground-based microwave receiver."

Claim 25, column 23, beginning at line 1 should read as follows:
"25. The power distribution system of claim 24, wherein the directional controller of the ground-based microwave transmitter points the ground-based microwave transmitter towards the ground-based microwave receiver, and wherein the directional controller of the ground-based microwave receiver points the ground-based microwave receiver towards the ground-based microwave transmitter."

Claim 26, column 23, beginning at line 29 should read as follows:
"26. The power distribution system of claim 24, wherein the ground-based microwave transmitter is a phased array transmitter."

CERTIFICATE OF CORRECTION (continued)
U.S. Pat. No. 8,596,581 B2

Claim 27, column 23, beginning at line 38 should read as follows:
"27. The power distribution system of claim 24, wherein the ground-based microwave transmitter is a parabolic transmitter."

Claim 28, column 24, beginning at line 1 should read as follows:
"28. The power distribution system of claim 24, where in the alignment electromagnetic radiation is columnated light."

Claim 29, column 24, beginning at line 4 should read as follows:
"29. The power distribution system of claim 24, wherein the alignment reflector modulates alignment error onto the reflected alignment radiation."

Claim 30, column 24, beginning at line 6 should read as follows:
"30. The power distribution system of claim 24, wherein the ground-based receiver further includes an allocator that allocates the incoming microwave energy into one or more output energy quantities responsive to the needs of one or more energy destinations and one or more secondary re-transmitters associated with the one or more allocated energy quantities with each re-transmitter including a respective directional controller, a respective focused controller and a amplitude controller for transmitting the respective energy quantities to the respective destinations of respective receivers for the destinations or for further transmission."

Claim 31, column 24, beginning at line 9 should read as follows:
"31. A power distribution system, comprising; a source of electricity, an electricity to microwave converter, a transmitter for transmitting the microwaves, a receiver for receiving the microwaves directly from one or more transmitters, a microwave to electricity converter, the transmitter having directional adjustments in at least two spacial dimensions, a source of alignment-electromagnetic radiation coupled to the transmitter that is coincident with the direction of the transmitter microwaves which illuminates the receiver."

Claim 32, column 24, beginning at line 20 should read as follows:
"32. The power distribution system of claim 31 wherein the transmitter includes an amplitude controller for controlling the amplitude of the received microwave energy to a magnitude of between 20 and 25 watts per square foot."

Claim 33, column 24, beginning at line 33 should read as follows:
"33. The power distribution system of claim 31 wherein the source of alignment-electromagnetic radiation is a laser."

Claim 34, column 24, beginning at line 37 should read as follows:
"34. The power distribution network of Claim 1 wherein the at least one microwave receiver and the plurality of microwave transmitters of the one or more microwave re-directors is a reflex array."